(12) United States Patent
Okada et al.

(10) Patent No.: US 9,162,888 B2
(45) Date of Patent: Oct. 20, 2015

(54) REFORMED GAS PRODUCTION METHOD AND REFORMED GAS PRODUCTION APPARATUS

(75) Inventors: Osamu Okada, Osakasayama (JP); Kota Yokoyama, Amagasaki (JP); Naoki Inoue, Higashiosaka (JP)

(73) Assignee: Osaka Gas Co., Ltd., Osaka (JP)

( * ) Notice: Subject to any disclaimer, the term of this patent is extended or adjusted under 35 U.S.C. 154(b) by 674 days.

(21) Appl. No.: 13/449,521

(22) Filed: Apr. 18, 2012

(65) Prior Publication Data
US 2012/0224997 A1   Sep. 6, 2012

Related U.S. Application Data

(62) Division of application No. 11/630,929, filed as application No. PCT/JP2005/011794 on Jun. 28, 2005, now Pat. No. 8,486,167.

(30) Foreign Application Priority Data

Jun. 28, 2004   (JP) ................. 2004-190429

(51) Int. Cl.
*C01B 3/38* (2006.01)
*B01J 8/04* (2006.01)
(Continued)

(52) U.S. Cl.
CPC ............... *C01B 3/382* (2013.01); *B01J 8/0492* (2013.01); *B01J 8/0496* (2013.01); *B01J 19/30* (2013.01); *C10L 3/08* (2013.01); *H01M 8/0612* (2013.01); *B01J 2208/00061* (2013.01); *B01J 2208/00203* (2013.01); *B01J 2208/00415* (2013.01); *B01J 2208/00522* (2013.01); *B01J 2208/00849* (2013.01); *B01J 2208/00973* (2013.01); *B01J 2208/025* (2013.01); *B01J 2219/0004* (2013.01); *B01J 2219/30215* (2013.01); *B01J 2219/30223* (2013.01); *C01B 2203/0244* (2013.01); *C01B 2203/085* (2013.01); *C01B 2203/1047* (2013.01); *C01B 2203/1058* (2013.01);
(Continued)

(58) Field of Classification Search
CPC ............... C01B 2203/1614; B01J 2208/00061
See application file for complete search history.

(56) References Cited

U.S. PATENT DOCUMENTS

| 3,828,474 A | 8/1974 | Quartulli |
| 5,112,527 A | 5/1992 | Kobylinski |

(Continued)

FOREIGN PATENT DOCUMENTS

| DE | 10064441 A1 | 6/2002 |
| DE | 10222803 A1 | 12/2003 |

(Continued)

*Primary Examiner* — Imran Akram
(74) *Attorney, Agent, or Firm* — The Webb Law Firm

(57) ABSTRACT

The present invention relates to a reformed gas production apparatus that includes a reaction chamber containing a reforming catalyst, a supply route to the reaction chamber, a reformed gas conduction route from the reaction chamber, and a reaction chamber temperature control means that controls a temperature of the reaction chamber. The supply route supplies a fluid that includes a fuel containing a hydrocarbon having at least two carbon atoms, at least one of steam and a carbon dioxide-containing gas, and an oxygen-containing gas. The fuel can be a mixed fuel that includes a plurality of types of hydrocarbons that each have at least two carbon atoms. The reaction chamber temperature control means relates to the thermal decomposition index temperature of the fuel, which defines an upper limit temperature of the reforming reaction region.

11 Claims, 12 Drawing Sheets

(51) Int. Cl.
  *B01J 19/30* (2006.01)
  *C10L 3/08* (2006.01)
  *H01M 8/06* (2006.01)

(52) U.S. Cl.
  CPC .. *C01B 2203/1247* (2013.01); *C01B 2203/142* (2013.01); *C01B 2203/143* (2013.01); *C01B 2203/169* (2013.01); *C01B 2203/1614* (2013.01); *C01B 2203/1619* (2013.01); *Y02E 60/50* (2013.01)

(56) References Cited

U.S. PATENT DOCUMENTS

| | | | |
|---|---|---|---|
| 5,169,730 A * | 12/1992 | Reichner et al. | 429/415 |
| 5,685,890 A | 11/1997 | Okada et al. | |
| 6,383,468 B1 | 5/2002 | Schussler et al. | |
| 6,596,424 B2 | 7/2003 | Goebel | |
| 6,730,285 B2 | 5/2004 | Aasberg-Petersen et al. | |
| 6,749,828 B1 | 6/2004 | Fukunaga | |
| 7,419,518 B2 * | 9/2008 | Ukai et al. | 48/127.9 |
| 2002/0095867 A1 * | 7/2002 | Katayama | 48/202 |
| 2002/0150800 A1 * | 10/2002 | Asou et al. | 429/20 |
| 2004/0175665 A1 | 9/2004 | Goebel | |
| 2005/0261534 A1 * | 11/2005 | Stell et al. | 585/648 |
| 2006/0083956 A1 * | 4/2006 | Ukai et al. | 429/12 |
| 2007/0259228 A1 * | 11/2007 | Hartvigsen et al. | 429/20 |

FOREIGN PATENT DOCUMENTS

| | | |
|---|---|---|
| EP | 1188713 A2 | 3/2002 |
| GB | 820257 | 9/1959 |
| JP | 07215701 | 8/1995 |
| JP | 10291803 | 11/1998 |
| JP | 2000084410 | 3/2000 |
| JP | 2001146406 | 5/2001 |
| JP | 2002097479 | 4/2002 |
| JP | 2002145604 | 5/2002 |
| JP | 2002356305 | 12/2002 |
| JP | 2003081604 | 3/2003 |
| JP | 2003277015 | 10/2003 |
| JP | 2004203722 | 7/2004 |
| JP | 2004217505 | 8/2004 |
| JP | 2004244274 | 9/2004 |
| JP | 2005200260 | 7/2005 |
| JP | 2005206395 | 8/2005 |

* cited by examiner

Fig.5 experiment results of Working Example 2
results of component analysis of reformed gas

| O₂/C | temperature (°C) | | | reformed gas composition (%) | | | | | |
|---|---|---|---|---|---|---|---|---|---|
| | Tin | Tmax. | Tout | H₂ | CH₄ | CO | CO₂ | C₃H₈ | N₂ |
| 0.3 | 300 | 410 | 375 | 24.6 | 18.4 | 0.6 | 15.8 | 0.1 | 40.5 |
| 0.6 | 300 | 480 | 427 | 22.2 | 8.1 | 1.5 | 14.4 | 0.0 | 53.8 |
| 0.8 | 300 | 512 | 451 | 23.3 | 3.0 | 1.7 | 14.2 | 0.0 | 57.8 |
| 1.0 | 300 | 549 | 477 | 21.4 | 0.8 | 1.8 | 13.9 | 0.0 | 62.1 |
| 1.4 | 300 | 586 | 504 | 8.6 | 0.1 | 1.8 | 12.8 | 0.0 | 76.7 |

Fig.6 experiment results of Working Example 3
(change over time in reformed gas composition)
reaction conditions
catalyst : Ni-/Al₂O₃(22wt%Ni/Al₂O₃)、catalyst fill amount : 6.6 ml、
catalyst fill height : 2.2cm、
reaction gas : C₃H₈+H₂O+Air ; inlet temperature Tin=400°C ;
total gas SV = 10000h⁻¹ ; S/C=2.5; O₂/C=0.15.

| reaction time (h) | H₂ (%) | CH₄ (%) | CO (%) | CO₂ (%) | C₃H₈ (%) | N₂ (%) |
|---|---|---|---|---|---|---|
| 1 | 30.1 | 26.0 | 1.3 | 17.6 | 0.0 | 25.0 |
| 2 | 28.3 | 27.4 | 1.1 | 17.6 | 0.0 | 25.6 |
| 3 | 27.8 | 27.8 | 1.1 | 17.5 | 0.0 | 25.8 |
| 4 | 28.2 | 27.6 | 1.0 | 17.6 | 0.0 | 25.6 |
| 5 | 28.2 | 27.5 | 1.1 | 17.5 | 0.0 | 25.7 |
| 8 | 28.3 | 27.4 | 1.1 | 17.6 | 0.0 | 25.6 |
| 11 | 27.9 | 27.8 | 1.0 | 17.5 | 0.0 | 25.8 |
| 14 | 27.6 | 28.0 | 1.0 | 17.5 | 0.0 | 25.9 |
| 17 | 27.8 | 27.9 | 1.0 | 17.5 | 0.0 | 25.8 |
| 22.5 | 27.8 | 27.8 | 1.0 | 17.5 | 0.0 | 25.9 |
| 25.6 | 27.6 | 27.9 | 1.0 | 17.6 | 0.0 | 25.9 |
| 28.5 | 27.8 | 27.8 | 1.1 | 17.6 | 0.0 | 25.7 |
| 31.3 | 27.7 | 28.0 | 1.1 | 17.6 | 0.0 | 25.7 |
| 34.17 | 27.6 | 27.9 | 1.1 | 17.5 | 0.0 | 25.9 |
| 37 | 27.7 | 27.7 | 1.1 | 17.6 | 0.0 | 25.9 |

Fig.7 experiment conditions and results of Working Examples 4 and 5
(result of component analysis of reformed gas)

|  |  | Working Example 4 | Working Example 5 |
|---|---|---|---|
| catalyst layer maximum temperature Tmax (°C) | | 505 | 504 |
| SV(1/h) | | 10000 | 10000 |
| S/C | | 0.667 | 0.5 |
| $O_2$/C | | 0.093 | 0.093 |
| $CO_2$/C | | 0 | 0.167 |
| reaction time (h) | | 7 | 5.3 |
| produced gas composition (%) after each reaction time | $H_2$ | 34.6 | 23.9 |
| | $CH_4$ | 51.0 | 45.8 |
| | CO | 3.2 | 6.4 |
| | $CO_2$ | 11.2 | 23.9 |
| | $C_2H_6$ | 0.0 | 0.0 |
| | $C_3H_8$ | 0.0 | 0.0 |
| | $C_4H_{10}$ | 0.0 | 0.0 |

Fig.8

| product number | catalyst composition(wt%) | S/C | $O_2$/C | peak temperature | C mass (wt%) |
|---|---|---|---|---|---|
| Working Example 6-1 | 2%Rh/$Al_2O_3$ | 0.60 | 0.20 | 733 | 0.1 |
| Working Example 6-2 | 0.7%Rh/$Al_2O_3$ | 0.60 | 0.20 | 722 | 0.1 |
| Working Example 6-3 | 0.7%Rh/$SiO_2$ | 0.60 | 0.20 | 699 | 0.0 |
| Working Example 6-4 | 0.1%Rh/$Al_2O_3$ | 0.60 | 0.20 | 715 | 0.1 |
| Working Example 6-5 | 0.1%Rh/$SiO_2$ | 0.60 | 0.20 | 708 | 0.0 |
| Working Example 6-6 | 2%Rh/$Al_2O_3$ | 0.60 | 0.20 | 707 | 0.1 |
| Working Example 6-7 | 2%Rh/$SiO_2$ | 0.60 | 0.20 | 752 | 0.0 |
| Working Example 6-8 | 0.1%Pd/$Al_2O_3$ | 0.60 | 0.10 | 715 | 0.3 |
| Working Example 6-9 | 0.1%Pt/$Al_2O_3$ | 2.10 | 0.20 | 731 | 0.1 |
| Comparative Example 6-1 | 0.01%Pt/$Al_2O_3$ | 0.60 | 0.15 | 828 | 1.9 |
| Comparative Example 6-2 | 0.1%Pt/$Al_2O_3$ | 0.60 | 0.15 | 790 | 0.4 |
| Comparative Example 6-3 | 0.1%Pt/$Al_2O_3$ | 0.60 | 0.15 | 825 | 3.9 |
| Comparative Example 6-4 | 0.1%Pd/$Al_2O_3$ | 0.60 | 0.15 | 799 | 1.9 |
| Comparative Example 6-5 | 2%Pd/$Al_2O_3$ | 0.60 | 0.20 | 809 | 2.4 |

Fig.10 experiment conditions and results of Working Example 7
(result of component analysis of reformed gas)

| microreactor 4A+9A conditions | | |
|---|---|---|
| S/C | | 2 |
| $O_2$/C | | 0.41 |
| $CO_2$/C | | 0.63 |
| microreactor 4A conditions | | |
| catalyst layer maximum temperature Tmax (°C) | | 512 |
| catalyst layer outlet temperature Tout (°C) | | 500 |
| SV(1/h) | | 20000 |
| S/C | | 0.5 |
| $O_2$/C | | 0.093 |
| $CO_2$/C | | 0.167 |
| microreactor 9A conditions | | |
| catalyst layer maximum temperature Tmax (°C) | | 895 |
| catalyst layer outlet temperature Tout (°C) | | 843 |
| reaction time (h) | | 200 |
| produced gas composition (%) after 200 hours (microreactor 9A outlet) | $H_2$ | 54.8 |
| | $CH_4$ | 0.1 |
| | CO | 25.8 |
| | $CO_2$ | 19.3 |
| | $C_2H_6$ | 0.0 |
| | $C_3H_8$ | 0.0 |
| | $C_4H_{10}$ | 0.0 |

Fig.11 experiment conditions and results of Working Examples 8 to 12

| | Working Example 8 | Working Example 9 | Working Example 10 | Working Example 11 | Working Example 12 |
|---|---|---|---|---|---|
| catalyst layer maximum temperature Tmax (°C) | 505 | 504 | 504 | 506 | 507 |
| SV(1/h) | 10000 | 10000 | 10000 | 10000 | 10000 |
| S/C | 0.667 | 0.667 | 0.667 | 0.667 | 0.667 |
| $O_2/C$ | 0.093 | 0.093 | 0.093 | 0.093 | 0.093 |
| total gas DMS concentration(mol.ppb) | 0 | 0.9 | 1.3 | 2.4 | 4.8 |
| reaction time (h) | 200 | 200 | 200 | 200 | 200 |
| reform rate (%) | 21.4 | 21.5 | 21.4 | 19.1 | 16.8 |

Fig.12 experiment conditions and results of Working Examples 13 to 17

| | Working Example 13 | Working Example 14 | Working Example 15 | Working Example 16 | Working Example 17 |
|---|---|---|---|---|---|
| catalyst layer maximum temperature Tmax (°C) | 700 | 705 | 721 | 735 | 762 |
| SV(1/h) | 10000 | 10000 | 10000 | 10000 | 10000 |
| S/C | 0.6 | 0.6 | 0.6 | 0.6 | 0.6 |
| $O_2/C$ | 0.2 | 0.2 | 0.2 | 0.2 | 0.2 |
| total gas DMS concentration(mol.ppb) | 0.5 | 1.5 | 5.5 | 10.5 | 50.5 |

| | |
|---|---|
| ethane | T= −30.183Ln(C)+859 |
| propane | T= −42.778Ln(C)+837 |
| n-butane | T= −47.888Ln(C)+818 |
| n-pentane | T= −51.03Ln(C)+815 |
| i-butane | T= −44.515Ln(C)+825 |
| i-pentane | T= −48.883Ln(C)+815 |

REFORMED GAS PRODUCTION METHOD AND REFORMED GAS PRODUCTION APPARATUS

CROSS REFERENCE TO RELATED PATENT APPLICATION

The present patent application is a divisional of U.S. patent application Ser. No. 11/630,929, having a PCT filing date of Jun. 28, 2005, and a 35 U.S.C. §371(c)(1), (2), (4) date of Jul. 9, 2008, the disclosure of which is incorporated herein by reference in its entirety.

BACKGROUND OF THE INVENTION

1. Field of the Invention

The present invention is related to reformed gas production methods and reformed gas production apparatuses for reforming hydrocarbon fuels to produce a synthesis gas that includes hydrogen and carbon monoxide.

2. Description of Related Art

This synthesis gas can be produced by reforming hydrocarbons or methanol, for example, and a reformed gas production apparatus that produces synthesis gas through such fuel reforming can be employed in the fields of synthesis gas production, such as the production of liquid fuel from natural gas (GTL), and the production of hydrogen for fuel cells, for example.

Currently, the three methods of steam reforming, partial oxidation, and autothermal reforming, which combines these two methods, are the primary methods for reforming hydrocarbon fuels.

Steam reforming is primarily used in the field of hydrogen production because of the high $H_2/CO$ ratio in the synthesis gas that it yields through Equation 1 below, and is employed for many applications. Because hydrogen is created from not only the hydrocarbon but also from the steam, there is a high $H_2/CO$ ratio, making this method effective for the production of hydrogen. On the other hand, being an endothermic reaction, the addition of heat from the outside becomes the rate-limiting factor and prevents the gas-space velocity (gas flow/catalyst amount) from being made large.

$$C_nH_{2n+2}+nH_2O \rightarrow (2n+1)H_2+nCO \quad [\text{Eq. 1}]$$

Partial oxidation (also known as partial combustion) is an exothermic reaction in which, as shown by Equation 2 below, fuel is partially oxidized (partial combustion) to produce hydrogen. This method is advantageous in that the reaction rate is fast and in that a large gas-space velocity can be achieved, while on the other hand its low thermal efficiency is one drawback to this method.

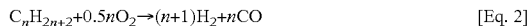

$$C_nH_{2n+2}+0.5nO_2 \rightarrow (n+1)H_2+nCO \quad [\text{Eq. 2}]$$

Partial oxidation yields a synthesis gas whose $H_2/CO$ ratio is lower than that of the synthesis gas produced by steam reforming, and is effective for instances where a low $H_2/CO$ ratio is preferable for the application in which the synthesis gas will be used. When fuel is reformed through partial oxidation, however, at the same time that hydrocarbons such as methane are reformed they may undergo dehydrogenation/oxidation and become heavy hydrocarbons or carbon, making continuous operation difficult and, as mentioned above, the thermal efficiency of partial oxidation is poor. Together these make it difficult for partial oxidation to be adopted as the method for reforming natural gas and naphtha, for example.

Autothermal reforming is a composite system in which the partial oxidation reaction and the steam reforming reaction are run in series or simultaneously to supply the heat required for the endothermic steam reforming reaction using the heat produced through partial oxidation. Generally there are two types of such systems. One is a series method of performing the partial oxidation reaction in the gas phase using a burner or the like and then performing steam reformation (hereinafter, abbreviated as ATR). The other is a method of running partial oxidation and steam reformation simultaneously using a catalyst (hereinafter, abbreviated as CPO). Methods for producing hydrogen or synthesis gas using these autothermal reforming methods have been disclosed in various publications (see JP 2000-84410A (pg. 2 to 14) and JP 2001-146406A (pg. 2 to 6)).

One problem with fuel reforming by an autothermal reforming method is that if the raw material is a hydrocarbon that has two or more carbon atoms, then there is much more pronounced carbon deposition near the inlet of the reformer than if methane is the raw material. That is, as shown in FIG. 17, the temperature near the inlet of the reformer rises abruptly due to the partial combustion of the hydrocarbon with oxygen, and this thermally decomposes hydrocarbons having two or more carbon atoms into carbon. For example, the working examples and comparative examples of JP 2001-146406A are examples in which carbon deposition was confirmed, and a conceivable reason for this is that the sudden elevation in the temperature of the catalyst layer inlet portion within the reaction chamber led to thermal decomposition of the hydrocarbon and subsequent carbon deposition.

In some instances, a pre-reformer is set up at an early stage as one way to solve the problem of fuel reforming by an autothermal reforming method (that being carbon deposition). Steam reformation and CPO are examples of reforming methods that may be performed at the pre-reformer (see JP 2002-97479A (pg. 2 to 5)). An autothermal reformer with pre-reformer such as that shown in FIG. 18 has been proposed as a steam reforming pre-reformer. That is, in the pre-reformer, the hydrocarbons are reformed into methane at a low temperature at which carbon deposition caused by steam reformation does not occur, and then the methane is reformed in an autothermal reformer and thereby converted into hydrogen and carbon monoxide. JP 2002-97479A discloses a CPO pre-reformer+ATR technology and mentions that all higher-order hydrocarbons are converted during CPO. It is clear that this technology is to be practiced under the premise that saturated hydrocarbons having two or more carbon atoms are converted by CPO.

However, this autothermal reformer with pre-reformer has the problem that if the pre-reformer is adopted for steam reforming, then the steam reforming reaction, whose rate of reaction is slower than that of the partial oxidation reaction, is performed at low temperatures, thus requiring large amounts of catalyst and therefore not allowing the reformer to be provided compact. Additionally, there is also the problem that if this autothermal reformer with pre-reformer is employed in the reforming system of an automobile fuel cell or a home fuel cell, in which starting and stopping is necessary on daily basis, then, because starting from normal temperatures is requires a significant amount of time, it becomes necessary to constantly burn hydrocarbon fuel, which is the raw material for reforming, in order to keep the reformer near the reforming temperature.

Adopting the pre-reformer for CPO allows the reforming efficiency to be increased, but on the other hand, the temperature of the catalyst layer inlet portion quickly becomes a high temperature, as discussed in JP 2001-146406A, and thus there is the problem that hydrocarbons having two or more carbon atoms are thermally decomposed and deposit carbon, precluding stable use of the apparatus over extended periods.

SUMMARY OF THE INVENTION

The present invention was arrived at in light of the foregoing matters, and it is a first object thereof to solve the problems of conventional autothermal reformers with a pre-reformer by providing a reformed gas production method and a reformed gas production apparatus that achieve a high reforming efficiency while preventing a drop in catalyst activity due to carbon deposition and maintaining stable performance over extended periods.

A second object is to provide a reformed gas production method and a reformed gas production apparatus with which it is possible to shorten the activation time.

A first characteristic means of the reformed gas production method according to the invention for achieving the foregoing object is a reformed gas production method of using a reforming catalyst to reform a fuel that contains a hydrocarbon having at least two carbon atoms so as to produce a reformed gas that includes methane, hydrogen, and carbon monoxide, the method comprising supplying a fluid that includes the fuel, at least one of steam and a carbon dioxide-containing gas, and an oxygen-containing gas, to a reforming reaction region, and with the thermal decomposition index temperature of the fuel, which is determined by the type and the concentration of the hydrocarbons having at least two carbon atoms that makes up the fuel, serving as an upper limit temperature of the reforming reaction region, bringing the fluid into contact with the reforming catalyst to produce the reformed gas.

That is, according to this first characteristic means, if a fuel that contains hydrocarbons having two or more carbon atoms is to be reformed into methane, hydrogen, and carbon monoxide, then in the reforming reaction region the fuel and an oxygen-containing gas are brought into contact with the reforming catalyst to expedite the exothermic partial oxidation reaction that produces hydrogen and carbon monoxide, and at the same time, the heat that is generated by this partial oxidation reaction is used to speed up the steam reforming reaction of reacting the fuel with water or carbon dioxide to reform the fuel into methane, which has a single carbon atom, hydrogen, and carbon monoxide. At this time, by setting the upper limit of the temperature in the reforming reaction region to the thermal decomposition index temperature of the fuel, it is possible to prevent thermal decomposition of the fuel, which contains hydrocarbons that have at least two carbon atoms. Depending on the conditions that are chosen, it is also possible to balance the heat generated by the partial oxidation reaction and the heat required for the steam reforming reaction, thereby obviating the need for the supply of heat from the outside.

It should be noted that the fuel in the present invention corresponds to the raw material for the reformed gas.

Here, thermal decomposition is used to mean the decomposition of a hydrocarbon into carbon or hydrogen, etc., in the gaseous phase or on a solid surface. In the present invention, the thermal decomposition index temperature of the fuel is used to mean the lower limit temperature of the fuel at which this phenomenon is readily observed.

The present inventors found that the thermal decomposition temperature at which a hydrocarbon thermally decomposes is dependant on the concentration of that hydrocarbon. After much keen investigation, the inventors arrived at the relationship between the concentration of the hydrocarbon and its thermal decomposition temperature shown in FIG. 19 through a method that will be discussed later.

Consequently, the thermal decomposition temperature of the hydrocarbons making up the fuel (that is, the thermal decomposition temperature that is determined by the type and the concentration of the hydrocarbons making up the fuel) is set as the thermal decomposition index temperature of the fuel, and by regarding this as the upper limit temperature, it is possible to prevent thermal decomposition of the fuel. That is, this temperature is set as the upper limit, and measures are taken to prevent this temperature from being reached.

Thus, as in the present invention, the safest and most reliable method to prevent a drop in catalyst activity due to carbon deposition and maintain stable performance over extended periods is to perform the reforming reactions under conditions in which the temperature in the reforming reaction region does not exceed the thermal decomposition index temperature of the fuel that is supplied. Incidentally, no disclosure of the matter of performing autothermal reforming taking the thermal decomposition index temperature that is determined based on the concentration of the hydrocarbon in the fuel as the upper limit of the temperature in the reforming reaction region was found in the prior art mentioned above. For example, in JP 2000-84410A, autothermal reforming is performed under the condition of 800° C. using naphtha (including hydrocarbons having five or more carbon atoms) as the hydrocarbon fuel, and because the reaction temperature is greater than the thermal decomposition index temperature of naphtha, carbon is deposited depending on the catalyst. In JP 2001-146406A, judging from the fact that the reforming reaction is carried out with the a heavy hydrocarbon serving as the fuel and a catalyst layer inlet temperature of 550° C. and a 680° C. outlet temperature, it can be assumed that the temperature of the catalyst layer, which is the reforming reaction region, is already a high temperature that is in excess of the thermal decomposition index temperature of the fuel, and in fact carbon deposition was observed. In JP 2002-97479A, a fuel that includes methane, ethane, propane, butane, and pentane is used as the hydrocarbon component, but judging from the fact that the outlet temperature is already at least 705° C., it is fair to assume that the temperature of the reforming reaction region is an even higher temperature that is in excess of the thermal decomposition temperature of the fuel.

Therefore, the present invention provides a reformed gas production method that achieves a high reforming efficiency while preventing a drop in catalyst activity due to carbon deposition and maintaining stable performance over an extended period.

A second characteristic means of the same is that the fuel is a mixed fuel that contains a plurality of types of hydrocarbons each having at least two carbon atoms, and that the thermal decomposition index temperature of the fuel is set to the value of the lowest temperature of the thermal decomposition temperatures found based on the concentration in the fuel of at least two types of hydrocarbons of the hydrocarbons having at least two carbon atoms that make up the fuel.

That is, according to this second characteristic means, if the fuel is a mixed fuel that has a plurality of types of hydrocarbons each having at least two carbon atoms, then those thermal decomposition temperatures corresponding to the concentrations are found from the concentrations of the hydrocarbons in the fuel based on the relationship between the concentrations of the hydrocarbons and their thermal decomposition temperatures, such as that shown in FIG. 19, and the value of the lowest temperature of those thermal decomposition temperatures is set as the thermal decomposition index temperature of the fuel. As a result, the thermal decomposition index temperature of the fuel can be set to a lower temperature than each of the thermal decomposition temperatures of the hydrocarbons constituting the fuel, and thus thermal decomposition of the fuel can be reliably prevented. Thus, it is possible to achieve a high reforming efficiency while preventing a drop in the catalyst activity due to the deposition of carbon and maintaining stable performance over long periods of time.

Even if the fuel contains 50% or more methane, which is a hydrocarbon that has a single carbon atom, by setting the thermal decomposition index temperature based on the type and the concentration of the hydrocarbons that have two or more carbon atoms as discussed above it is possible to favorably achieve the objectives of the present invention.

Natural gas can be adopted as the fuel that is used in the present invention. In this case, the general composition of natural gas does not include substantially any hydrocarbons that have six or more carbon atoms, and even if it does, the concentration of those hydrocarbons is low and they have little effect, and thus the thermal decomposition temperatures of the hydrocarbons that have five or less carbon atoms should be taken into consideration. That is, if natural gas is used as the fuel, then from the concentrations of the hydrocarbons each having 2 to 5 carbon atoms, of the hydrocarbons that have two or more carbon atoms, it is possible to find the thermal decomposition temperatures corresponding to those concentrations and then to set the value of the lowest temperature of those thermal decomposition temperatures as the thermal decomposition index temperature of the fuel. For example, the lowest value of the thermal decomposition temperatures corresponding to the respective concentrations of ethane, propane, n-butane, n-pentane, i-butane, and i-pentane, which may be contained in natural gas, can be set as the thermal decomposition index temperature of the fuel.

A third characteristic means of the same is that a supply amount ratio of at least one of the oxygen-containing gas, the steam, and the carbon dioxide-containing gas that are supplied to the reforming reaction region with respect to the fuel is changed to adjust the temperature in the reforming reaction region.

That is, according to this third characteristic means, the temperature of the reforming reaction region is related to the balance between the heat generated by the partial oxidation reaction and the heat consumed by the steam reforming reaction, and thus the supply amount ratio of at least one of the oxygen-containing gas, the steam, and the carbon dioxide-containing gas with respect to the fuel is adjusted such that the thermal decomposition index temperature of the fuel becomes the upper limit of the temperature in the reforming reaction region.

For example, when the ratio of the supply amount of the oxygen-containing gas with respect to the fuel is increased, the rate of the partial oxidation reaction of the hydrocarbon fuel is increased, and thus the temperature of the reforming reaction region increases, whereas when the ratio of the supply amount of the oxygen-containing gas with respect to the fuel is reduced, the partial oxidation reaction of the hydrocarbon fuel is inhibited, and thus the temperature of the reforming reaction region drops. Similarly, when the ratio of the supply amount of the steam or the carbon dioxide-containing gas with respect to the fuel is increased, the endothermic reforming reaction of the hydrocarbon fuel is expedited, and thus the temperature of the reforming reaction region drops, whereas when the ratio of the supply amount of the steam or the carbon dioxide-containing gas with respect to the fuel is reduced, the endothermic reforming reaction of the hydrocarbon fuel is inhibited, and thus the temperature of the reforming reaction region increases.

Thus, a favorable embodiment of a reformed gas production method with which by changing the supply amount of at least one of the oxygen-containing gas, the steam, and the carbon dioxide-containing gas while keeping the supply amount of the hydrocarbon fuel constant it is possible to adjust the temperature of the reforming reaction region to a suitable temperature is provided.

A fourth characteristic means of the same is that a hydrogen-containing gas is supplied to the reforming reaction region.

That is, according to this fourth characteristic means, it is possible to supply hydrogen-containing gas to the reforming reaction region to quickly raise the temperature of the reforming reaction region.

For example, when a hydrogen-containing gas, the fuel, and the oxygen-containing gas are supplied to the reforming reaction region, then the hydrogen, which starts to combust at a lower temperature than the hydrocarbon fuel, reacts with the oxygen and is combusted, and hydrogen combusts on the reforming catalyst, even in the presence of steam, when the temperature of the reforming reaction region is 100° C. or more, and thus the heat from combustion of the hydrogen quickly raises the temperature of the reaction chamber without an accompanying deposition of carbon material, and this allows partial oxidation and steam reforming to be run smoothly.

Thus, a favorable embodiment of a reformed gas production method with which a quick temperature raising operation becomes possible is provided.

A fifth characteristic means of the same is that until the temperature of the reforming reaction region reaches a suitable operating temperature necessary to reform the fuel (the temperature at which the fuel starts being reformed), the hydrogen-containing gas and an oxygen-containing gas are supplied to the reforming reaction region and the hydrogen is combusted, and with that heat from the combustion of hydrogen, the temperature of the reforming reaction region is raised up to the suitable operating temperature.

That is, according to this fifth characteristic means, when the apparatus is first activated, hydrogen-containing gas and oxygen-containing gas are supplied to the reforming reaction region, and with the heat that is produced by the catalyst-mediated combustion reaction between the hydrogen and the oxygen, in a short time the temperature of the reforming reaction region can be quickly raised to a suitable operation temperature.

Thus, a favorable embodiment of a reformed gas production method that has superb activation properties is provided.

A sixth characteristic means of the same is that the reforming catalyst is a catalyst whose primary component is a metal that has a steam reforming capability.

That is, according to this sixth characteristic means, a reforming catalyst whose primary component is a metal that has a steam reforming capability is provided in the reforming reaction region. A catalyst whose primary component is preferably one metal selected from Ni, Co, Ru, Rh, Pt, and Pd is favorable. Although there are no particular limitations regarding the substrate, the substrate preferably has as its primary component one selected from alumina, zirconia, silica, titania, magnesia, and calcia.

Consequently, a favorable embodiment of a reformed gas production method provided with a reforming catalyst for favorably achieving a reforming action in the reforming reaction region is provided.

A seventh characteristic means of the same is that before being supplied to the reforming reaction region, at least one of the fuel, the oxygen-containing gas, the steam, and the carbon dioxide-containing gas is subjected to desulfurization.

That is, according to this seventh characteristic means, after thorough investigation by the present inventors in order to clarify the correlation between the sulfur concentration in the fluid that is supplied to the reforming reaction region and the reforming reaction activity and the maximum temperature in the reforming reaction region, it was found that sulfur compounds cause a sudden drop in catalytic activity and raise in the temperature of the reforming reaction region. Thus, the fluid is supplied to the reforming reaction region after sulfur compounds in the gases are removed. It should be noted that a copper-zinc-based desulfurizing agent whose primary components are copper oxide CuO and zinc oxide ZnO can be adopted to effect desulfurization.

Thus, a favorable embodiment of a reformed gas production method with which a drop in reforming performance due to sulfur poisoning of the reforming catalyst is substantially prevented and a drop in reforming catalyst activity due to carbon deposition is prevented, allowing stable performance to be maintained over an extended period of time, is provided.

An eighth characteristic means of the same is that the entire fluid is subjected to desulfurization before being supplied to the reforming reaction region such that the concentration of sulfur compounds is not more than 2.4 mol·ppb.

That is, according to this eighth characteristic means, the present inventors, through a method that will be discussed later, found the relationship between the concentration of dimethyl sulfide (hereinafter abbreviated as DMS), which is a sulfur compound, in the fluid and the maximum temperature in the reforming reaction region, as shown in FIGS. 11 to 13. That is, by desulfurizing the entire fluid such that the concentration of sulfur compounds is not more than 2.4 mol·ppb before the fluid is supplied to the reforming reaction region, it is possible to almost entirely eliminate the effect that sulfur compounds have regarding the drop in reforming catalyst activity and the rise in reforming reaction region temperature. It should be noted that the concentration of the sulfur compounds is more preferably not more than 1.5 mol·ppb and even more preferably not more than 1.3 mol·ppb.

Thus, a favorable embodiment of a reformed gas production method with which sulfur poisoning of the reforming catalyst that is provided in the reaction chamber and a rise in the temperature of the reforming reaction region can be reliably prevented is provided.

A ninth characteristic means of the same is that a fluid that includes an oxygen-containing gas and the reformed gas that is created in the reforming reaction region is supplied to a second reforming reaction region and brought into contact with a second reforming catalyst, a maximum temperature in the second reforming reaction region is maintained within a temperature range of 400 to 1200° C., and an outlet temperature of the second reforming reaction region is adjusted such that it is higher than an outlet temperature of the reforming reaction region, so as to produce a second reformed gas that includes hydrogen and carbon monoxide.

That is, according to this ninth characteristic means, in the case of reforming a fuel that contains hydrocarbons that have two or more carbon atoms into hydrogen and carbon monoxide, a two-stage structure in which there is an early stage reforming reaction region and a later stage second reforming reaction region allows, in the early stage reforming reaction region, the thermal decomposition index temperature of the fuel to be set as the upper limit of the temperature in the reforming reaction region as discussed above so as to produce methane (one carbon atom) while preventing thermal decomposition of that fuel, and, in the later stage second reforming reaction region, if the exothermic partial oxidation reaction in which the reformed gas reacts with an oxygen-containing gas and the endothermic steam reforming reaction in which the reformed gas reacts with either steam or carbon dioxide are run simultaneously, allows the temperature of the second reforming reaction region to be kept below 1200° C., which is the temperature at which the thermal decomposition of methane becomes noticeable, thereby preventing the thermal decomposition of methane. On the other hand, if the reaction temperature of the second reforming reaction region is too low, then the reforming reaction of methane will not proceed, and thus the lower limit temperature is set to 400° C. and the temperature of the second reforming reaction region is set to a temperature within the range of 400° C. to 1200° C. (not inclusive of 1200° C., however).

Further, adjusting the temperature of the second reforming reaction region such that the outlet temperature of the second reforming reaction region is higher than the outlet temperature of the reforming reaction region speeds up the partial oxidation reaction in the second reforming reaction region of the reformed gas that is created in the reforming reaction region, and thus the proportion of hydrogen can be lowered, and the proportion of carbon monoxide can be raised, in the composition of the reformed gas created in the second reforming reaction region.

Thus, a favorable embodiment of a reformed gas production method with which, in the case of reforming a fuel that contains hydrocarbons that have two or more carbon atoms into hydrogen and carbon monoxide, in the later stage second reforming reaction region it is possible to achieve a high reforming efficiency while the drop in catalyst activity due to carbon deposition and deterioration of the catalyst due to excessive heat are prevented, allowing stable performance to be maintained over an extended period of time, and with which it is also possible to produce a favorable reformed gas that has a low ratio of hydrogen to carbon monoxide as the raw material of a liquid fuel, for example.

A tenth characteristic means of the same is that at least one of steam and a carbon dioxide-containing gas is supplied to the second reforming reaction region.

That is, according to this tenth characteristic means, in a case where the reformed gas that is created in the early stage reforming reaction region is to be reformed into a synthesis gas that includes hydrogen and carbon monoxide in the second reforming reaction region, the exothermic partial oxidation reaction in which the reformed gas reacts with an oxygen-containing gas to create hydrogen and carbon monoxide is allowed to proceed, and simultaneously the heat that is generated by this partial oxidation reaction is used to run the endothermic steam reforming reaction, in which the reformed gas reacts with either steam or carbon dioxide to create hydrogen and carbon monoxide. Depending on the conditions that are chosen, it is also possible to balance the heat generated by the partial oxidation reaction and the heat required for the steam reforming reaction, thus obviating the need for the supply of heat from the outside. In this case, when the supply ratio between the steam and the carbon dioxide-containing gas that are supplied to the second reforming reaction region is changed, the proportion of hydrogen and carbon monoxide in the synthesis gas that is created is changed.

Consequently, a favorable embodiment of a reformed gas production method with which, in the case of reforming a reformed gas that is made of methane, hydrogen, and carbon monoxide into a second reformed gas that includes hydrogen and carbon monoxide, it is possible to achieve a high reforming efficiency while allowing the proportion of hydrogen and carbon monoxide in the second reformed gas that is created to be adjusted as necessary is provided.

An eleventh characteristic means of the same is that a supply amount ratio of at least one of the oxygen-containing gas, the steam, and the carbon dioxide-containing gas, which are supplied to the second reforming reaction region, with respect to the reformed gas is changed to adjust the temperature of the second reforming reaction region.

That is, according to this eleventh characteristic means, the temperature of the second reforming reaction region is related to the balance between the heat produced by the partial oxidation region and the heat consumed by the steam reforming reaction, and thus to adjust the temperature of the second reforming reaction region, the ratio of the supply amount of at least one of the oxygen-containing gas, the steam, and the carbon dioxide-containing gas with respect to the reformed gas is adjusted.

For example, when the ratio of the supply amount of the oxygen-containing gas with respect to the reduced gas is increased, the rate of the partial oxidation reaction of the reduced gas is increased, and thus the temperature of the second reforming reaction region increases, whereas when the ratio of the supply amount of the oxygen-containing gas with respect to the reduced gas is reduced, the partial oxidation reaction of the reduced gas is inhibited, and thus the temperature of the second reforming reaction region drops. Similarly, when the ratio of the supply amount of the steam or the carbon dioxide-containing gas with respect to the reduced gas is increased, the endothermic reforming reaction of the reduced gas is sped up, and thus the temperature of the second reforming reaction region drops, whereas when the ratio of the supply amount of the steam or the carbon dioxide-containing gas with respect to the reduced gas is reduced, the endothermic reforming reaction of the reduced gas is inhibited, and thus the temperature of the second reforming reaction region increases.

Consequently, a favorable embodiment of a reformed gas production method with which by changing the supply amount of at least one of the oxygen-containing gas, the steam, and the carbon dioxide-containing gas while keeping the supply amount of the reduced gas constant it is possible to adjust the temperature of the second reforming reaction region to a suitable temperature is provided.

A twelfth characteristic means of the same is that, before being supplied to the second reforming reaction region, at least one of the reformed gas, the oxygen-containing gas, the steam, and the carbon dioxide-containing gas is subjected to desulfurization.

That is, according to this twelfth characteristic means, the sulfur compounds in the respective gases are removed before those gases at supplied to the second reforming reaction region such that the activity of the second reforming catalyst of the second reforming reaction region does not drop due to those sulfur compounds. As a specific value of a sulfur compound concentration of the entire fluid at which sulfur poisoning of the second reforming catalyst in the second reforming reaction region does not occur, it is preferable that the concentration of sulfur compounds is set to not more than 2.4 mol·ppb for the same reasons as those given in the description of eighth characteristic means. It is further preferable that this concentration is set to not more than 1.5 mol·ppb and even more preferably to not more than 1.3 mol·ppb. It should be noted that a copper-zinc-based desulfurizing agent whose primary components are copper oxide CuO and zinc oxide ZnO can be adopted to effect desulfurization.

Consequently, a favorable embodiment of a reformed gas production method in which the reforming ability of the second reforming catalyst of the second reforming reaction region does not drop due to sulfur poisoning is provided, and at the same time, a favorable embodiment of a reformed gas production method with which a favorable reforming gas that does not include sulfur compounds can be produced as the raw material for a liquid fuel, for example, is provided.

A thirteenth characteristic means of the same is that the second reforming catalyst is a catalyst whose primary component is a metal that has a steam reforming capability.

That is, according to this thirteenth characteristic means, a second reforming catalyst whose primary component is a metal that has a steam reforming capability is provided in the second reforming reaction region. A catalyst whose primary component is preferably one metal selected from Ni, Co, Ru, Rh, Pt, and Pd is favorable. Although there are no particular limitations regarding the substrate, the substrate preferably has as its primary component one selected from alumina, zirconia, silica, titania, magnesia, and calcia.

Thus, a favorable embodiment of a reformed gas production method provided with a second reforming catalyst that achieves a favorable reforming effect in the second reforming reaction region is provided.

A fourteenth characteristic means of the same is that a total gas flow amount that is supplied to the reforming reaction region is a gas-space velocity per hour within a range of 750 $h^{-1}$ to 300000 $h^{-1}$.

That is, according to this fourteenth characteristic means, the steam reforming reaction and the partial oxidation reaction, which has a fast rate of reaction, are run simultaneously in the reforming reaction region, and thus the total gas flow that is supplied to the reforming reaction region can be changed over the broad range of a gas-space velocity per hour of 750 $h^{-1}$ to 300000 $h^{-1}$ so that the reforming reaction can be suitably carried out within the reaction chamber regardless of whether the amount of reformed gas that is created is increased or decreased.

Thus, a favorable embodiment of a method for operating a reformed gas production apparatus with which it is possible to stably carry out the reforming reaction over a wide range of gas flow amounts is provided.

A first characteristic configuration of a reformed gas production apparatus according to the present invention that is for achieving the foregoing objectives is a reformed gas production apparatus that comprises a reaction chamber containing a reforming catalyst, a supply route that supplies a fluid that includes a fuel containing a hydrocarbon having at least two carbon atoms, at least one of steam and a carbon dioxide-containing gas, and an oxygen-containing gas, to the reaction chamber, a reformed gas conduction route that conducts a reformed gas that is created through a reforming reaction and that includes methane, hydrogen, and carbon monoxide, from the reaction chamber, and reaction chamber temperature control means that controls a temperature of the reaction chamber, wherein the fuel is a mixed fuel that contains a plurality of types of hydrocarbons each having at least two carbon atoms, and wherein the reaction chamber temperature control means sets the thermal decomposition index temperature of the fuel, which is determined based on the gas type and the concentration of the hydrocarbons having at least two carbon atoms that make up the fuel, as the upper limit temperature of the reforming reaction region, and in a case where the maximum temperature in the reforming reaction region exceeds the upper limit temperature, the reaction chamber temperature control means performs control to cool the reaction chamber.

That is, according to this first characteristic configuration, if a mixed fuel that contains hydrocarbons having two or more carbon atoms is to be reformed into methane, hydrogen, and carbon monoxide, then the exothermic partial oxidation reaction, in which the fuel and an oxygen-containing gas are reacted to produce hydrogen and carbon monoxide, is run in the reaction chamber advance, and at the same time, the heat that is generated by this partial oxidation reaction is used to push forward the steam reforming reaction of reacting the fuel with water or carbon dioxide to reform the fuel into methane, which has a single carbon atom, hydrogen, and carbon monoxide, for example. At this time, the thermal decomposition index temperature of the fuel is regarded as the upper limit temperature of the temperature in the reaction chamber and control is performed such that the temperature in the reaction chamber is controlled does not reach this upper limit temperature, and if it does exceed the upper limit temperature, then it is possible to perform a control for cooling the reaction chamber in order to prevent thermal decomposition of the fuel.

Thus, a reformed gas production apparatus with which a high reforming efficiency can be achieved while a drop in catalyst activity due to carbon deposition can be prevented so that stable performance is maintained over an extended period of time is provided.

A second characteristic configuration of the same is that the value of the lowest temperature of the thermal decomposition temperatures found based on a concentration in the fuel of at least two types of hydrocarbons having at least two carbon atoms that make up the fuel is selected as the thermal decomposition index temperature of the fuel.

That is, according to this second characteristic configuration, the thermal decomposition temperatures corresponding to the concentrations in the fuel of hydrocarbons that have two or more carbon atoms contained in the fuel are found, and the value of the lowest of those thermal decomposition temperatures can be set as the thermal decomposition index temperature of the fuel. The thermal decomposition index temperature is controlled such that it does not exceed this temperature, and if it does exceed this temperature, and it is possible to perform a control to cool the reaction chamber so that thermal decomposition of the fuel is reliably prevented. As a result, it is possible to achieve high reforming efficiency while preventing a drop in the catalyst activity due to the deposition of carbon so as to maintain stable performance over an extended period of time.

A third characteristic configuration of the same is that the fuel contains at least 50% methane.

That is, according to this third characteristic configuration, even if the fuel contains 50% or more methane, by regarding the temperature determined based on the gas type and concentration of the hydrocarbons having two or more carbon atoms that make up the fuel as the thermal decomposition index temperature and performing control to keep this temperature as the upper limit, it is possible to reliably prevent thermal decomposition of the fuel.

A fourth characteristic configuration of the same is that the fuel is a natural gas, and the thermal decomposition index temperature of the fuel is set to the value of the lowest temperature of the thermal decomposition temperatures found based on a concentration in the fuel of hydrocarbons having from 2 to 5 carbon atoms that make up the fuel.

That is, according to this fourth characteristic configuration, natural gas can be adopted as the fuel that is used, in which case the general composition of natural gas does not include substantially any hydrocarbons that have six or more carbon atoms, and even if it does, the concentration of those hydrocarbons is low and they have little effect, and thus the thermal decomposition temperatures of those are found from the concentrations of the hydrocarbons each having 2 to 5 carbon atoms, of the hydrocarbons that have two or more carbon atoms, and the value of the lowest thermal decomposition temperature of those can be to set as the thermal decomposition index temperature of the fuel. For example, the lowest value of the thermal decomposition temperatures corresponding to the respective concentrations of ethane, propane, n-butane, n-pentane, i-butane, and i-pentane, which may be contained in the natural gas, can be taken as the thermal decomposition index temperature of the fuel.

A fifth characteristic configuration of the same is that the concentration is the hydrocarbon concentration of the fuel at an inlet portion of the reaction chamber.

That is, according to this fifth characteristic configuration, the hydrocarbons in the fuel are reformed through the reforming reaction in the reaction chamber, and as a result their concentrations drop. On the other hand, as shown in FIG. 19, the thermal decomposition temperatures of the hydrocarbons increase as the concentrations of those hydrocarbons decreases. Thus, by performing control to set the thermal decomposition temperature of the fuel based on the highest concentration of the hydrocarbons in the fuel, that is, the concentration at which the thermal decomposition temperature is lowest, thermal decomposition of the fuel can be reliably prevented.

A sixth characteristic configuration of the same is that a temperature sensor that detects the temperature of the reforming reaction region, and control means that controls the temperature of the reaction chamber by adjusting a supply amount ratio of at least one of the oxygen-containing gas, the steam, and the carbon dioxide-containing gas that are supplied to the reforming reaction region with respect to the fuel based on the information detected by the temperature sensor, are provided as the reaction chamber temperature control means.

That is, according to this sixth characteristic configuration, the ratio of the supply amount of at least one of the oxygen-containing gas, the steam, and the carbon dioxide-containing gas supplied into the reaction chamber with respect to the fuel is adjusted based on the detected temperature within the reaction chamber. It should be noted that because it is difficult to control the temperature when the ratio of the amount of oxygen-containing gas that is supplied with respect to the fuel ($O_2/C$) is too high, in large-scale apparatuses it is preferable that this supply amount ratio ($O_2/C$) is in the range of 0.01 to 0.5.

Thus, a favorable embodiment of a reformed gas production apparatus with which accurate automatic temperature control of the temperature within the reaction chamber based on the detected information on the reforming reaction region temperature within the reaction chamber is possible is provided.

A seventh characteristic configuration of the same is that the apparatus is further provided with a temperature adjustment mechanism that is capable of cooling or heating the reforming reaction region.

That is, according to this seventh characteristic configuration, if the temperature of the reforming reaction region has become too high, then the reaction chamber is cooled so that the thermal decomposition index temperature of the fuel is not exceeded, and if the temperature of the reforming reaction region has become too low for the reaction to proceed smoothly, then the reaction chamber is heated. It should be noted that the reaction chamber is cooled and heated either by cooling and heating the entire reaction chamber or by lowering and raising the inlet temperature of the reaction chamber.

Thus, a favorable embodiment of a reformed gas production apparatus with which the reaction temperature of the reforming reaction region can be maintained such that it does not deviate from a suitable temperature range is provided.

An eighth characteristic configuration of the same is that the apparatus is further provided with detection means that detects a type and a concentration of hydrocarbons having at least two carbon atoms that make up the fuel that is supplied to the reaction chamber, and thermal decomposition index temperature derivation means that derives the thermal decomposition index temperature of the fuel based on the type and the concentration of the hydrocarbons detected by the detection means.

That is, with this eighth characteristic configuration, it is possible to detect the type and concentration of the hydrocarbons and derive their thermal decomposition temperatures whenever fuel is supplied to the reaction chamber, and thus the ideal thermal decomposition index temperature can be derived even if the composition of the supplied fuel changes, and this allows thermal decomposition of the fuel to be prevented.

Thus, a favorable embodiment of a reformed gas production apparatus with which the temperature in the reforming reaction region can be controlled based on the information on the concentrations of the hydrocarbons having two or more carbon atoms within the supplied fuel is provided.

A ninth characteristic configuration of the same is that the apparatus is further provided with a desulfurizing apparatus that desulfurizes at least one of the fuel, the oxygen-containing gas, the steam, and the carbon dioxide-containing gas before it is supplied to the reaction chamber.

That is, with this ninth characteristic configuration, sulfur compounds in the various gases are removed before those gases are supplied to the reaction chamber so that activity of the reforming catalyst contained in the reaction chamber does not drop due to those sulfur compounds, and so that the temperature in the reforming reaction region does not rise. It should be noted a copper-zinc-based desulfurizing agent whose primary components are copper oxide CuO and zinc oxide ZnO can be adopted to achieve desulfurization.

Thus, a favorable embodiment of a reformed gas production apparatus with which a drop in the reforming ability of the reforming catalyst due to sulfur poisoning can be substantially prevented and a drop in activity of the reforming catalyst due to carbon deposition can be prevented to allow stable performance to be maintained over an extended period of time is provided.

A tenth characteristic configuration of the same is that the apparatus further comprises a second reaction chamber that contains a second reforming catalyst and that produces a second reformed gas that includes hydrogen and carbon monoxide through a second reforming reaction of the reformed gas that has been conducted from the reaction chamber, wherein a maximum temperature in the second reforming reaction region of the second reaction chamber is maintained within a temperature range of 400 to 1200° C., and an outlet temperature of the second reaction chamber is adjusted such that it is higher than an outlet temperature of the reaction chamber.

That is, according to this tenth characteristic means, in the case of reforming a fuel that contains hydrocarbons that have two or more carbon atoms into hydrogen and carbon monoxide, a two-stage reaction chamber configuration in which there is an early stage reaction chamber and a later stage second reaction chamber allows, in the early stage reaction chamber, the thermal decomposition index temperature of the fuel to be taken as the upper limit of the temperature in the reforming reaction region as discussed above to prevent thermal decomposition of the fuel while producing a reformed gas whose main components are methane (one carbon atom), carbon monoxide, and hydrogen, and, in the later stage second reforming reaction region, if the exothermic partial oxidation reaction in which the reformed gas reacts with an oxygen-containing gas and the endothermic reforming reaction in which the reformed gas reacts either with steam or carbon dioxide are run simultaneously, allows the temperature of the second reforming reaction region to be kept below 1200° C., which is the temperature at which the thermal decomposition of methane noticeably occurs, to prevent the thermal decomposition of methane. On the other hand, when the reaction temperature of the second reforming reaction region is too low, the reforming reaction of methane will not proceed, and thus a lower limit temperature of 400° C. is adopted and the temperature of the second reforming reaction region is set to a temperature within the range of 400 to 1200° C. (not inclusive of 1200° C., however).

Further, adjusting the temperature of the second reaction chamber such that the outlet temperature of the second reaction chamber is higher than the outlet temperature of the reaction chamber pushes forward the partial oxidation reaction in the second reaction chamber with respect to the reformed gas that has been created in the reaction chamber, and as a result the proportion of hydrogen in the composition of the reformed gas produced from the second reaction chamber drops, allowing the proportion of carbon monoxide therein to be raised.

Thus, a favorable embodiment of a reformed gas production apparatus with which, in the case of reforming a fuel that contains hydrocarbons that have two or more carbon atoms into hydrogen and carbon monoxide, in the later stage second reaction chamber it is possible to achieve a high reforming efficiency while preventing a drop in catalyst activity due to carbon deposition and deterioration of the catalyst due to excessive heat, allowing stable performance to be maintained over an extended period of time, and with which it is also possible to produce a favorable reformed gas that has a low ratio of hydrogen to carbon monoxide as the raw material of a liquid fuel, for example, is provided.

An eleventh characteristic configuration of the same is that the reformed gas production apparatus is employed in mobile and stationary applications alike.

That is, according to this eleventh characteristic means, simultaneously running the partial oxidation reaction and the steam reforming reaction in the reaction chamber or the second reaction chamber allows an overall compact reformed gas production apparatus to be formed while also allowing the rate of reaction to be increased in order to produce a large amount of reformed gas, such as hydrogen. In the case of a compact reformed gas production apparatus for a mobile or a stationary application, the heat that is recovered by a heat exchanger, for example, from the high-temperature reformed gas that is created in the second reaction chamber can be used to heat water and thus steam that can be supplied to the reaction chamber or the second reaction chamber can be produced easily, and thus a special heat source for steam generation is not necessary, and in this regard as well, the apparatus can be provided compact.

Thus, a favorable embodiment of a reformed gas production apparatus that is compact and high-performance, and further that is suited for use in mobile and stationary applications, is provided.

BRIEF DESCRIPTION OF THE DRAWINGS

FIG. 5 is a diagram showing the results of the experiment in which propane is reformed with a ruthenium-based catalyst (Working Example 2);

FIG. 6 is a diagram showing the conditions and the results of an experiment in which propane is reformed with a nickel-based catalyst (Working Example 3);

FIG. 7 is a diagram showing the conditions and the results of experiments in which a pseudo-natural gas is reformed with a ruthenium-based catalyst (Working Examples 4 and 5);

FIG. 8 is a diagram showing the carbon production conditions of Working Examples 6-1 to 6-9 and Comparative Examples 6-1 to 6-5;

FIG. 10 is a diagram showing the conditions and the results of an experiment for evaluating the properties of a two-stage structure reformer made of a low-temperature reformer and a high-temperature reformer (Working Example 7);

FIG. 11 is a diagram that shows the conditions and the results of experiments in which a pseudo-natural gas that includes sulfur is reformed with a ruthenium-based catalyst (Working Examples 8 through 12);

FIG. 12 is a diagram that shows the conditions and the results of experiments in which a pseudo-natural gas that includes sulfur is reformed with a ruthenium-based catalyst (Working Examples 13 through 17);

DETAILED DESCRIPTION OF THE INVENTION

Embodiments of the reformed gas production method and the reformed gas production apparatus (hereinafter referred to as fuel reforming apparatus) according to the present invention are described.

Figure 1:
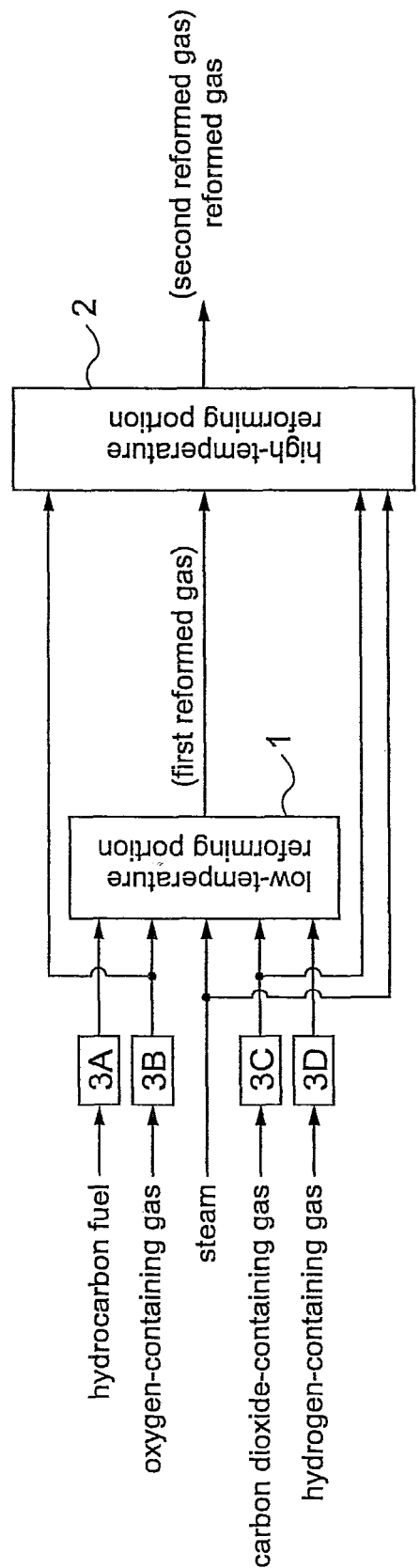
FIG. 1 is a conceptual view of a reformed gas production apparatus according to the present invention.

FIG. 1 is a conceptual view of the fuel reforming apparatus, which is made of two stages of reforming portions, these being a low-temperature reforming portion 1 and a high-temperature reforming portion 2. That is, the low-temperature reforming portion 1 (hereinafter, called the low-temperature reformer 1) of the first stage supplies a fluid that includes at least one of steam and a carbon dioxide-containing gas, a fuel that contains hydrocarbons having two or more carbon atoms (hereinafter, this may also be referred to as hydrocarbon fuel having two or more carbon atoms), and an oxygen-containing gas to a reaction chamber containing a reforming catalyst, and with the thermal decomposition index temperature of the fuel serving as the upper limit temperature of the reforming reaction region, adjusting the temperature of the reaction chamber in order to produce a reformed gas that includes methane, hydrogen and carbon monoxide (hereinafter, this is referred to as the first reformed gas).

The high-temperature reforming portion 2 (hereinafter, high-temperature reformer 2) of the later stage supplies a fluid containing the oxygen-containing gas and the first reformed gas that is produced in the reaction chamber to a second reaction chamber that contains a second reforming catalyst, maintains the maximum temperature in the second reformation reaction region within a temperature range of 400 to 1200° C., and adjusts the temperature of the second reaction chamber such that the outlet temperature of the second reforming reaction region is higher than the outlet temperature of the reforming reaction region so as to produce a second reformed gas that includes hydrogen and carbon monoxide. The first reformed gas and the oxygen-containing gas are supplied to the second reaction chamber, to which at least one of steam and a carbon dioxide-containing gas can be supplied.

As shown in FIG. 1, the fuel, the oxygen-containing gas, and the carbon dioxide-containing gas that are supplied into the reaction chamber of the low-temperature reformer 1 are desulfurized by the desulfurizing apparatuses 3A, 3B, 3C, which are provided before the low-temperature reformer 1. Ion-exchange water is used as the raw material to create the steam, and therefore the steam also is desulfurized to a sulfur concentration of a low ppb level.

The desulfurizing apparatus 3B for the oxygen-containing gas also serves as the desurfurizing apparatus for the oxygen-containing gas that is supplied to the high-temperature reformer 2, the desulfurizing apparatus 3C for the carbon dioxide-containing gas also serves as the desulfurizing apparatus for the carbon dioxide-containing gas that is supplied to the high-temperature reformer 2, and the desulfurized steam is supplied to the high-temperature reformer 2. That is, the oxygen-containing gas and the carbon dioxide-containing gas that are supplied into the second reaction chamber of the high-temperature reformer 2 are desulfurized by the desulfurizing apparatuses 3B and 3C, which are provided before the second reaction chamber of the high-temperature reformer 2.

It should be noted that it is only necessary that the amount of sulfur in the fluid is lowered to at least a desired value, and thus it is not essential for desulfurization to be performed for all of the plurality of supplied fluids.

Figure 2:
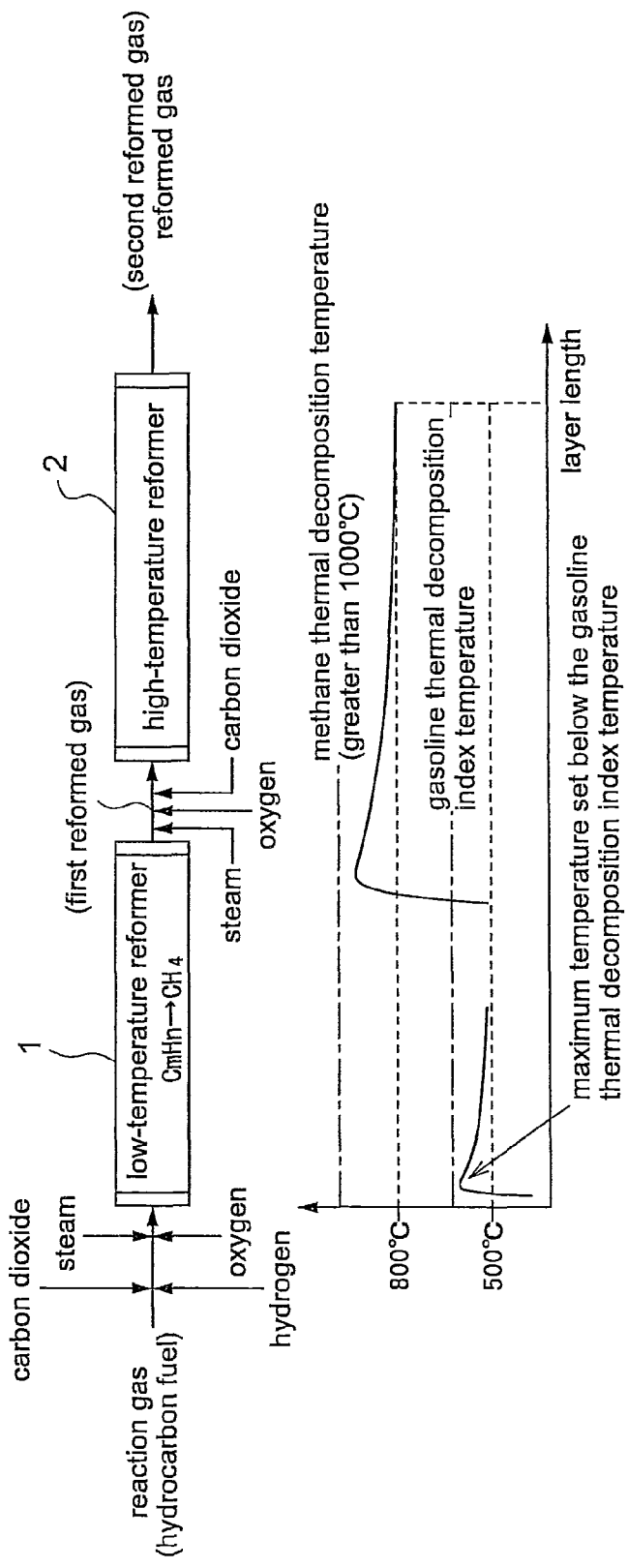
FIG. 2 is a graph showing the configuration and the temperature distribution of the reformer of the reformed gas production apparatus according to the present invention.

As shown in FIG. 2, in the fuel reforming apparatus, the low-temperature reformer 1 is operated regarding the thermal decomposition index temperature of the fuel as its upper limit, and the high-temperature reformer 2 is operated within a temperature range of 400 to 1200° C. (preferably 500 to 1100° C. and more preferably 600 to 1000° C.). For example, if gasoline is supplied as the hydrocarbon fuel, then the temperature in the reforming reaction region within the reaction chamber of the low-temperature reformer 1 is maintained at a temperature that is below the minimum thermal decomposition temperature of the hydrocarbon components of the gasoline that has been determined based on the concentration of those components, and the reaction temperature within the second reaction chamber of the high-temperature reformer 2 is maintained at a temperature below the thermal decomposition temperature of methane (1200° C.). That is, the temperature is not permitted to reach or exceed 1200° C., which is the temperature at which the thermal decomposition of methane within the first reforming gas noticeably occurs.

The temperature of the reaction chamber of the low-temperature reformer 1 can be adjusted by changing the ratio of the supply amount at least one of the oxygen-containing gas, the steam, and the carbon dioxide-containing gas that are supplied into the reaction chamber of the low-temperature reformer 1 with respect to the hydrocarbon fuel. Specifically, adjusting the temperature of the reaction chamber of the low-temperature reformer 1 is achieved by changing the ratio of the amount of oxygen-containing gas that is supplied with respect to the hydrocarbon fuel supplied to the low-temperature reformer 1.

It is also possible to supply a hydrogen-containing gas into the reaction chamber of the low-temperature reformer 1. It should be noted that it is possible to use the offgas of a fuel cell or the reformed gas, for example, as the hydrogen-containing gas that is supplied to the low-temperature reformer 1. There is no particular limitations regarding the hydrogen concentration, although preferably the gas contains at least 30% hydrogen. Also, as shown in FIG. 1, a desulfurizing apparatus 3D for the hydrogen-containing gas that is supplied to the low-temperature reformer 1 is provided before the low-temperature reformer 1.

The reforming catalyst contained in the reaction chamber of the low-temperature reformer 1 is a catalyst whose primary component is a metal that has the ability to reform steam. Similarly, the second reforming catalyst contained in the second reaction chamber of the high-temperature reformer 2 is a catalyst whose primary component is a metal that has the ability to reform steam. The reforming catalyst and the second reforming catalyst preferably are reforming catalysts that have an excellent ability to reform steam and that are high resistant to carbon deposition. Specifically, it is preferable that a precious metal catalyst such as rhodium, iridium, platinum, palladium, or ruthenium is used, although it is also possible to use a nickel-based or a cobalt-based catalyst. It is possible to use only a single type of metal, and as necessary it is also possible to use two or more types of metals together. These catalysts can have any shape, and there are no particular limitations regarding the substrate, although preferably the substrate has as its main component one species selected from alumina, zirconia, silica, titania, magnesia, and calcia as, and preferably the catalyst is used supported on the substrate in the form of a tablet-shaped, spherical, or annular molding, or used molded into a honeycomb shape.

A representative example of the manufacture of this type of catalyst is described with regard to a case in which ruthenium is supported on an alumina substrate. It is prepared by immersing a spherical alumina substrate (4 to 6 mm) in ruthenium chloride aqueous solution ($RuCl_3.3H_2O$) and drying it in air for two hours at 80° C., then the substrate is immobilized (treated with NaOH aqueous solution), reduced (treated with hydrazine aqueous solution), and then washed (treated at 90° C.) and dried (left in air at 80° C.).

The total gas flow supplied to the reaction chamber of the low-temperature reformer 1 is a gas-space velocity per hour (standard condition converted values) within a range of 750 $h^{-1}$ to 300000 $h^{-1}$ (preferably 10000 $h^{-1}$ to 300000 $h^{-1}$, more preferably 50000 $h^{-1}$ to 300000 $h^{-1}$). That is, it is possible to alter the total gas flow over this broad range of gas-space velocities.

There is no particular limitation regarding the pressure during reaction. Depending on the application, the reaction pressure can be changed. For example, if the apparatus is used to produce hydrogen for a fuel cell, then it will be used at near standard pressure (for example, 1 MPa or less), and if it is used in a liquid fuel synthesis application such as GTL, then it can be used at about 2 to 7 MPa.

When the fuel reforming apparatus is activated, until the temperature (reaction temperature) of the reaction chamber of the low-temperature reformer 1 reaches a suitable operating temperature (400° C., for example) that is necessary in order to reform the hydrocarbon fuel, the hydrocarbon fuel, the hydrogen-containing gas, and the oxygen-containing gas are supplied to the reaction chamber of the low-temperature reformer 1 and the hydrogen is combusted, and the heat from this combustion of hydrogen raises the temperature of the reaction chamber of the low-temperature reformer 1 up to that suitable operating temperature. It should be noted that steam also is added at some point while the temperature is rising up to the suitable operating temperature (for example, when the reaction temperature has reached 300° C.), and hydrogen combustion is continued in the presence of that steam. Once the temperature of the reaction chamber of the low-temperature reformer 1 has reached the suitable operating temperature, the supply of the hydrogen-containing gas into the reaction chamber of the low-temperature reformer 1 is stopped and an operation is performed to switch to a state in which hydrocarbon fuel, oxygen-containing gas, and steam are supplied.

It should be noted that when the apparatus is activated as above, it is possible to supply the hydrocarbon fuel, the hydrogen-containing gas, and the oxygen-containing gas to the reaction chamber of the low-temperature reformer 1, but when the apparatus is activated it is also possible to supply only hydrogen-containing gas and oxygen-containing gas. Also, as the temperature is rising up to the suitable operating temperature, it is possible to supply additional carbon dioxide in place of the steam, to supply additional steam and carbon dioxide, or to not supply either steam or carbon dioxide while the temperature is rising up to the suitable operating temperature.

A working example of temperature decomposition temperature measurement at various concentrations of hydrocarbon is described below.

Measurement of the Thermal Decomposition Temperature

The thermal decomposition temperature was measured for five different hydrocarbons: ethane, propane, n-butane, n-pentane, i-butane, and i-pentane.

For pure hydrocarbons (100%), the reagent gas (a hydrocarbon-helium based gas of a predetermined concentration) is passed at a predetermined flow rate into a silica glass tube that is arranged passing into an electric furnace, and after carbon deposited onto the surface of an iron sheet for carbon deposition that is arranged in a central portion of the silica tube, the presence of carbon deposition was assed using Raman analysis (crystalline carbon peak of 1,600 cm-1) of the carbon deposition portion surface. The present inventors call this measuring technique "flow measurement."

In a case where there are gas concentrations, a TG-40 thermobalance made by Shimazu Seisakusho was used to measure the thermal decomposition temperature. Measurements were made primarily for the case of a 1% concentration, and for i-pentane, the case of less than 1% concentration also was measured. Measurement was performed in accordance with a known method for measuring thermal decomposition temperature using a thermobalance. That is, a high-purity (99.99% purity) thin iron film is cut into approximately 20×10 mm pieces and these are placed within a platinum receptacle of the thermobalance and then reduced at a temperature from room temperature to 1000° C. by hydrogen gas diluted by helium to 3%. Next, the hydrocarbon gas to be measured was passed from a high-pressure gas cylinder through a flowmeter into the thermobalance measurement apparatus while the increase in mass that follows from carbon deposition is measured within a temperature range of room temperature to 1000° C., and the temperature at which an increase in mass began to occur was regarded as the thermal decomposition temperature.

Figure 19:
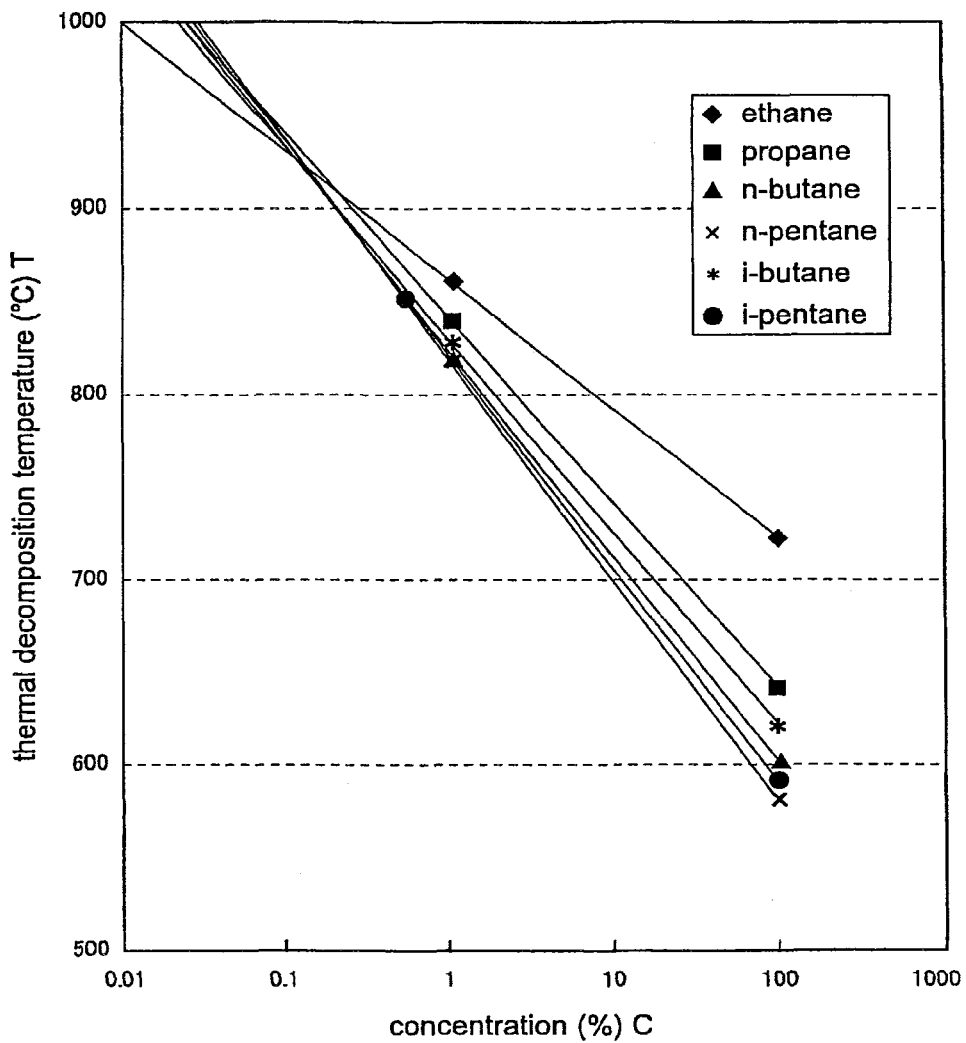
FIG. 19 is a graph showing the relationship between the concentration of the hydrocarbons and the thermal decomposition temperature.

At a result, it was found that hydrocarbon concentration and thermal decomposition temperature have the relationship shown in FIG. 19. For 100% concentration samples, the thermal decomposition temperatures of the various components shown in FIG. 19 are near the known thermal decomposition temperature for that particular gas, and are represented well. On the other hand, as can be understood from the results for i-pentane, whose concentration was found at three points, the thermal decomposition temperature rises as the concentration drops.

Figure 3:
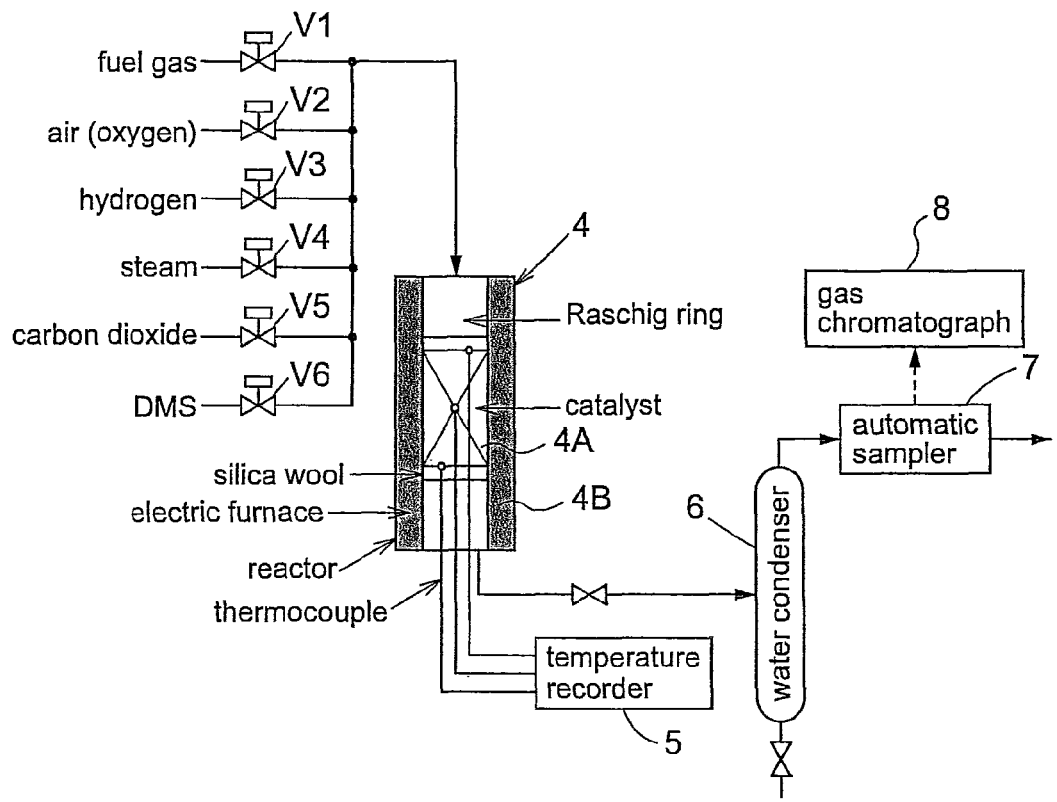
FIG. 3 is a structural diagram of the testing apparatus for evaluating the characteristics of the low-temperature reformer.

The results of reforming experiments performed using the experimental apparatus shown in FIG. 3 are described below as working examples of experiments performed with the low-temperature reformer 1.

The experimental apparatus is provided with a reactor 4 having a reaction chamber 4A that is filled with a reforming catalyst (hereinafter, called the microreactor), a temperature recorder 5 that measures and records the temperature within the microreactor 4A, a water condenser 6 that condenses water in the output gas from the reactor 4, an automatic sampler 7 that samples the output gas that has passed through the water condenser 6, and a gas chromatograph 8 that analyses the sample gas, and the supply sources for the hydrocarbon fuel gas, oxygen or air as oxygen-containing gas, hydrogen as hydrogen-containing gas, steam, carbon dioxide as carbon dioxide-containing gas, and methane containing a 10 ppm concentration of dimethyl sulfide (DMS) are supplied to the catalyst-filled layer of the reaction chamber 4A after passing through stop valves V1 to V6. The catalyst-filled layer of the reaction chamber 4A is surrounded by the electric furnace 4B, a Raschig ring is provided at its inlet side and silica wool is provided at its outlet side.

That is, the reaction chamber 4A corresponds to the reaction chamber of the low-temperature reformer 1, and the temperature of the reaction chamber 4A can be adjusted by the electric furnace 4B, which serves as a temperature adjustment mechanism that is capable of heating the reaction chamber 4A. The temperature recorder 5 allows the temperature of the fluid that is supplied into the reaction chamber 4A and comes into contact with the reforming catalyst to be measured. It should be noted that in the following working examples the stop valves V1 to V6 are manually operated to adjust the amount of the gases and steam that is supplied, and in all cases the reactions were performed at standard pressure.

Working Example 1

Activation of the Reforming Apparatus when the Fuel Gas is Propane

Figure 4:
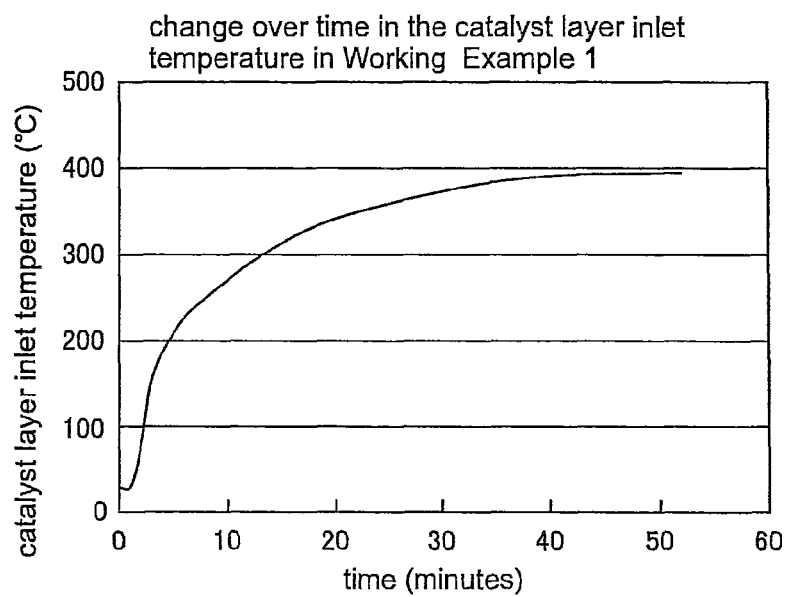
FIG. 4 is a graph showing the results of the rise in temperature due to hydrogen combustion in the low-temperature reformer (Working Example 1)

The characteristics of the rise in temperature due to the catalytic combustion of hydrogen were measured to asses the activation state. The microreactor 4A was filled with 33 mL of a ruthenium-based reforming catalyst Ru/Al$_2$O$_3$ (2 wt % Ru/alumina substrate, particle diameter: 0.5 to 1.0 mm). The other conditions were: propane (C$_3$H$_8$) supply rate 176 mL/min, hydrogen supply rate 158 mL/min, and oxygen supply rate 79 mL/min. When the mixed gas of hydrogen, oxygen, and propane was introduced at room temperature into the reactor 4 under these conditions, the catalyst-mediated hydrogen combustion reaction heated the catalyst-filled layer, raising its temperature. FIG. 4 shows the characteristics of the rise in the temperature of the catalyst-filled layer inlet at this time, and after approximately 40 minutes it had reached 400° C. (suitable operating temperature).

It should be noted that during this operation, the temperature of the electric furnace 4B surrounding the catalyst layer was heated to a temperature 5° C. lower than the catalyst layer temperature to prevent the radiation of heat from the reactor 4 (unless this is done, the temperatures of the reactor 4 and the catalyst layer will not rise).

Working Example 2

Reforming Propane with a Ruthenium-Based Catalyst

The partial oxidation and steam reforming reactions of propane gas were performed using the same apparatus as that of Working Example 1. In this experiment, air was used as the oxygen-containing gas.

The experiment conditions were as follows.

| catalyst | ruthenium supported on alumina |
| --- | --- |
| catalyst fill amount | 3.3 mL |
| fill height | 1.0 cm |
| reaction gas | propane + air + steam |
| O$_2$/C (mole ratio) | 0.3 to 1.4 |
| S/C | 2.5 |
| SV | 10000 h$^{-1}$ |
| inlet temperature | 300° C. |

FIG. 5 shows the experiment results when, at SV=10000 h$^{-1}$ and a Tin of 300° C., the O$_2$/C ratio is altered over a range of 0.3 to 1.4 and S/C is changed to 2.5.

The results of the experiment indicate the following.

The greater the O$_2$/C ratio, the higher the maximum temperature Tmax within the catalyst layer, which is the reforming reaction region, and the catalyst layer outlet temperature Tout are with respect to the inlet temperature Tin. As a result, it was clear that it is possible to control the reaction temperature with the O$_2$/C ratio.

It is also shown that the maximum temperature Tmax of the catalyst layer is below the thermal decomposition index temperature of propane (approximately 640° C.). That is, in this working example, the maximum temperature Tmax of the catalyst layer was 50 to 200° C. (50, 100, 130, 150, 200° C.) lower than the thermal decomposition index temperature of propane.

After reacting for five hours, the reactor was returned to room temperature, dismantled and examined. In none of the cases was it found that carbon deposition had occurred inside the reactor or on the catalyst surface.

Working Example 3

Reforming Propane with a Nickel-Based Catalyst

Using a nickel catalyst Ni/Al$_2$O$_3$ (nickel concentration 22 wt %, alumina substrate) in lieu of a ruthenium-based catalyst, propane gas was subjected to partial oxidation and steam reforming using the same apparatus as that of Working Example 1. The experiment conditions and results are shown in FIG. 6. It is clear that propane gas is stably reformed into hydrogen and methane, for example.

It should be noted that after being loaded into the microreactor, the Ni catalyst was reduced for one hour at 400° C. by nitrogen gas that included 10% hydrogen.

After the reaction, the reactor was returned to room temperature, dismantled and examined, and carbon deposition was not found to have occurred inside the reactor or on the catalyst surface.

Working Example 4

Reforming Pseudo-Natural Gas with a Ruthenium-Based Catalyst

Using the same experiment apparatus as that of Working Example 1, 2.4 mL of the ruthenium-based catalyst $Ru/Al_2O_3$ (2 wt % Ru/alumina substrate, particle diameter: 0.5 to 1.0 mm) were filled into the microreactor 4A and the partial oxidation and steam reforming reactions were run using a pseudo-natural gas (methane concentration 88%, ethane 6%, propane 4%, i-butane 2%). In this working example, pure oxygen was used as the oxygen-containing gas. FIG. 7 shows the experiment conditions and the experiment results.

The maximum temperature Tmax of the catalyst layer, which is the reforming reaction region, is 505° C., and the thermal decomposition index temperature of the pseudo-natural gas is approximately 777° C., which is the lowest temperature of thermal decomposition temperatures for 6% ethane, 4% propane, and 2% i-butane from FIG. 19, and thus clearly the maximum temperature Tmax is lower than this thermal decomposition index temperature. That is, in this working example, the maximum temperature Tmax of the catalyst layer was 300° C. below the thermal decomposition index temperature of the pseudo-natural gas.

After the reaction, the reactor was returned to room temperature, dismantled and examined, and carbon deposition was not found to have occurred inside the reactor or on the catalyst surface.

Working Example 5

Reforming Pseudo-Natural Gas with a Ruthenium-Based Catalyst

Using the same experiment apparatus as that of Working Example 1, 2.4 mL of the ruthenium-based catalyst $Ru/Al_2O_3$ (2 wt % Ru/alumina substrate, particle diameter: 0.5 to 1.0 mm) were filled into the microreactor 4A and partial oxidation, steam reforming, and $CO_2$ reforming were run using a pseudo-natural gas (methane concentration 88%, ethane 6%, propane 4%, i-butane 2%). In this working example, pure oxygen was used as the oxygen-containing gas. FIG. 7 shows the experiment conditions and the experiment results.

It is clear that the addition of carbon dioxide allowed the $H_2/CO$ ratio to be reduced over that of Working Example 4. The maximum temperature Tmax of the catalyst layer of the reforming reaction region is 504° C., and clearly is lower than the approximately 777° C. thermal decomposition index temperature of the pseudo-natural gas. That is, in this working example, the maximum temperature Tmax of the catalyst layer was 300° C. below the thermal decomposition index temperature of the pseudo-natural gas.

After the reaction, the reactor was returned to room temperature, dismantled and examined, and carbon deposition was not found to have occurred inside the reactor or on the catalyst surface.

Working Examples 6-1 to 6-9

Comparative Examples 6-1 to 6-5

Using the same experiment apparatus as that of Working Example 1, the catalyst was filled into the microreactor 4A and partial oxidation, steam reforming, and $CO_2$ reforming were performed using a pseudo-natural gas (methane concentration 88%, ethane 6%, propane 4%, i-butane 2%). In these working examples, pure oxygen was used as the oxygen-containing gas. FIG. 8 shows the experiment conditions and the experiment results.

It is clear from FIG. 8 that when Rh is used as the catalyst and the reactions are performed under temperature conditions in which the thermal decomposition index temperature (approximately 777° C.) serves as the upper limit temperature, the carbon deposition amount can be significantly inhibited to less than 0.1 wt %. That is, in these working examples, the maximum temperature Tmax of the catalyst layer was 40 to 80° C. (40, 50, 60, 70, 80° C.) below the thermal decomposition index temperature of the pseudo-natural gas.

Also, when Pt or Pd was used as the catalyst, performing the reactions below the thermal decomposition index temperature resulted in a significant reduction in the carbon deposition amount compared to when those reactions were run under temperature conditions in excess of the thermal decomposition index temperature. From these results it is can be understood that with the reformed gas production method of the present invention, in which reactions are performed below the thermal decomposition index temperature, it is possible to inhibit carbon deposition and significantly increase the durability of the catalyst.

In the above Working Examples 1 to 6, the reforming experiments were performed with only the early stage reforming portion (low-temperature reformer 1). Working Example 7 below describes the results of a reforming experiment in which reforming is performed in both the early stage reforming portion (low-temperature reformer 1) and the later stage reforming portion (high-temperature reformer 2).

Working Example 7

Reforming Pseudo-Natural Gas with a Ruthenium-Based Catalyst

Figure 9:
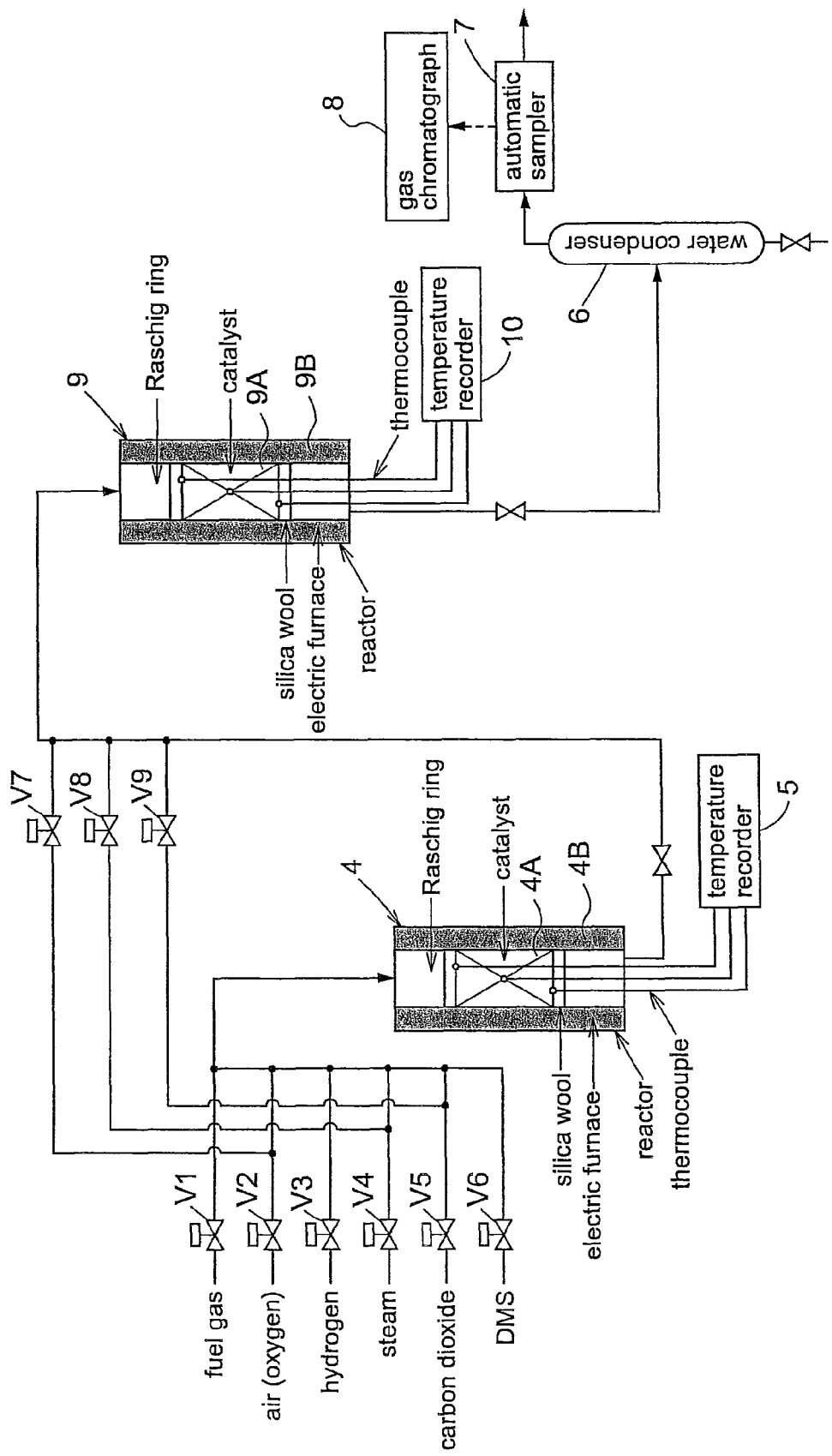
FIG. 9 is a structural diagram of a testing apparatus for evaluating the properties of a two-stage structure reformer made of a low-temperature reformer and a high-temperature reformer.

Using an experimental apparatus that has two stages of microreactors in series as shown in FIG. 9, 2.9 mL of a ruthenium-based reforming catalyst $Ru/Al_2O_3$ (2 wt % Ru/alumina substrate, particle diameter: 0.5 to 1.0 mm) were filled into the early stage microreactor 4A, and 2.9 mL of the same ruthenium-based reforming catalyst $Ru/Al_2O_3$ were filled into the later stage microreactor 9A as a second reforming catalyst, and then partial oxidation, steam reforming, and $CO_2$ reforming were performed using a pseudo-natural gas (methane concentration 88%, ethane 6%, propane 4%, i-butane 2%). It should be noted that the later stage reactor 9 has the same configuration as the early stage reactor 4 (see FIG. 3), and is constituted by a microreactor 9A and an electric furnace 9B, for example. It is also provided with a temperature recorder 10 for measuring the temperature within the microreactor 9A. In Working Example 7, pure oxygen was used as the oxygen-containing gas. The output gas from the later stage reactor 9 was sampled and analyzed.

That is, the microreactor 9A corresponds to the second reaction chamber of the high-temperature reformer 2, and the temperature of the second reaction chamber 9A can be adjusted by the electric furnace 9B, which serves as a temperature adjustment mechanism that is capable of heating the second reaction chamber 9A. The temperature recorder 10 allows the temperature of the fluid that is supplied into the second reaction chamber 9A and comes into contact with the second reforming catalyst to be measured.

FIG. 10 shows the experiment conditions and the experiment results. The conditions of the early stage microreactor 4A are those shown in FIG. 10, and as shown in FIG. 9, oxygen, steam, and carbon dioxide are added via stop valves V7 to V9 between the early stage microreactor 4A and the later stage microreactor 9A. The total amount of steam that is added to the inlets of the microreactors 4A and 9A with respect to the pseudo-natural gas that is introduced to the microreactor 4A inlet is recorded under the microreactor 4A+9A conditions as the S/C ratio. Similarly, for the oxygen and the carbon dioxide, the total amount of oxygen or carbon dioxide that is added to the inlets of the microreactors 4A and 9A with respect to the pseudo-natural gas that is introduced to the microreactor 4A inlet is recorded under the microreactor 4A+9A conditions as the $O_2/C$ ratio or the $CO_2/C$ ratio, respectively.

The catalyst layer maximum temperature of the first stage reformer (microreactor 4A) is 512° C. and the catalyst layer maximum temperature of the second stage reformer (microreactor 9A) is 895° C., and it was possible to stably operate the apparatus for 200 hours. From this it can be understood that the temperature of the second reaction chamber (microreactor 9A) is adjusted such that the outlet temperature of the second reaction chamber (microreactor 9A) is higher than the outlet temperature of the reaction chamber (microreactor 4A).

The maximum temperature Tmax of the early stage reforming catalyst layer is 512° C. and therefore lower in temperature than the approximately 777° C. thermal decomposition index temperature of the pseudo-natural gas. The maximum temperature Tmax of the later stage second reforming catalyst layer is 895° C., which is a temperature that is lower than the thermal decomposition temperature of methane. That is, in this working example, the maximum temperature Tmax of the early stage reforming catalyst layer is 250° C. lower than the thermal decomposition index temperature of the pseudo-natural gas, and the maximum temperature Tmax of the later stage reforming catalyst layer is 300° C. lower than the thermal decomposition index temperature of methane. The outlet temperature Tout of the second reforming catalyst layer of the later stage is 843° C., which is higher than the 500° C. outlet temperature Tout of the reforming catalyst layer of the early stage. After the reaction, the reactors were returned to room temperature, dismantled and examined, and carbon deposition was not found to have occurred inside the reactor or on the catalyst surface of either the microreactor 4A or the microreactor 9A.

Next, discussion will return to the results of reforming experiments performed using the early stage reforming portion (low-temperature reformer 1).

Working Examples 8 to 12

Experiments in which Pseudo-Natural Gas Containing Sulfur is Reformed with a Ruthenium-Based Catalyst Using the same experiment apparatus as that of Working Example 1, 2.4 mL of a ruthenium-based reforming catalyst Ru/Al$_2$O$_3$ (2 wt % Ru/alumina substrate, particle diameter: 0.5 to 1.0 mm) were filled into the microreactor 4A, the partial oxidation reaction and the steam reforming reaction were run using a pseudo-natural gas (methane concentration 88%, ethane 6%, propane 4%, butane 2%), and the reform rate (%) was found. In these working examples, pure oxygen was used as the oxygen-containing gas. FIG. 11 shows the experiment conditions and the experiment results. In Working Examples 8 to 12, the reactions are run under DMS concentrations ranging up to 5 mol·ppb, where in Working Example 8 no DMS is added, in Working Example 9 the DMS concentration is 0.9 mol·ppb per total gas, in Working Example 10 the DMS concentration is 1.3 mol·ppb per total gas, in Working Example 11 the DMS concentration is 2.4 mol·ppb per total gas, and in Working Example 12 the DMS concentration is 4.8 mol·ppb per total gas.

It should be noted that the reform rate in FIG. 11 is found by the following expression, and expresses the proportion of carbon in the raw material gas that does not remain as hydrocarbon in the output gas and is converted in CO and CO$_2$ gas.

Reform Rate (%)=(outlet CO concentration+outlet CO$_2$ concentration)×100/(outlet methane concentration+outlet CO concentration+outlet CO$_2$ concentration+outlet C2 component concentration× 2+outlet C3 component concentration×3+outlet C4 component concentration×4)     [Ex. 1]

As shown in FIG. 11, no sudden drops in activity (drop in reform rate) are seen at any of the DMS concentrations under 5 mol·ppb, but particularly below 1.3 mol·ppb it is clear that there is no effect whatsoever (the reform rate does not change). In the case of 2.4 mol·ppb, there is a slight change in reform rate over time compared to Working Examples 8 to 10, but it is clear that in practical terms this change is so minor enough that it has substantially no effect. Consequently, the fuel reforming apparatus is operated in such a manner that the sulfur concentration in the total gas supplied to the early stage reforming portion (low-temperature reformer 1) does not exceed 2.4 mol·ppb. It should be noted that these results can be similarly applied to the later stage reforming portion (high-temperature reformer 2) as well, and thus the fuel reforming apparatus is operated in such a manner that the sulfur concentration in the total gas supplied to the later stage reforming portion (high-temperature reformer 2) does not exceed 2.4 mol·ppb. Also, the maximum temperature Tmax of the catalyst layer is from 504° C. to 507° C., which is below the thermal decomposition index temperature of the pseudo-natural gas (approximately 777° C.). That is, in these working examples, the maximum temperature Tmax of the catalyst layer is 250° C. lower than the thermal decomposition index temperature of the pseudo-natural gas.

After the reactions, the reactors were returned to room temperature, dismantled and examined, and carbon deposition was not found to have occurred inside the reactor or on the catalyst surface in any of the working examples.

Working Examples 13 to 17

Figure 13:
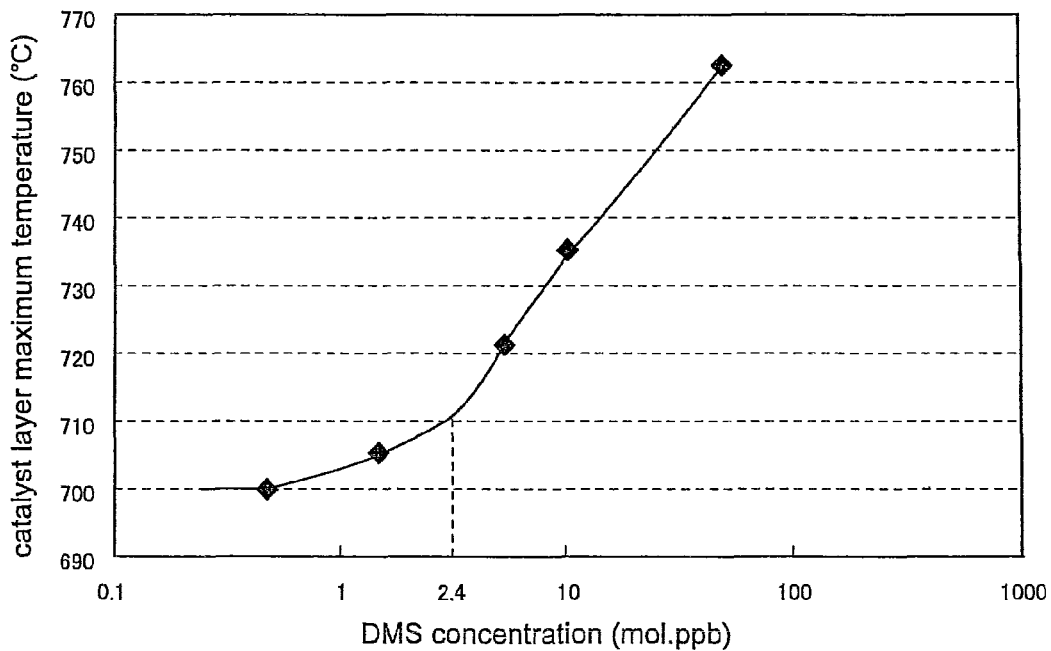
FIG. 13 is a graph showing the relationship between DMS concentration and the catalyst layer maximum temperature.

Using the same experiment apparatus as that of Working Example 1, 300 mL of a ruthenium-based reforming catalyst Ru/Al$_2$O$_3$ (2 wt % Ru/alumina substrate, particle diameter: 0.5 to 1.0 mm) were filled into the microreactor 4A and partial oxidation and steam reforming were run using a pseudo-natural gas (methane concentration 88%, ethane 6%, propane 4%, butane 2%). In these working examples, pure oxygen was used as the oxygen-containing gas. The experiment conditions and the experiment results are shown in FIG. 12 and FIG. 13. The sulfur concentrations, catalyst quantity, and $O_2/C$ ratios are different from those of Working Examples 8 to 12. That is, in Working Examples 13 to 17 the reactions are performed over DMS concentrations ranging up to 50.5 mol·ppb, where in Working Example 13 the DMS concentration is 0.5 mol·ppb per total gas, in Working Example 14 the DMS concentration is 1.5 mol·ppb per total gas, in Working Example 15 the DMS concentration is 5.5 mol·ppb per total gas, in Working Example 16 the DMS concentration is 10.5 mol·ppb per total gas, and in Working Example 17 the DMS concentration is 50.5 mol·ppb per total gas. Also, the amount of catalyst was set to 125 times the amount of catalyst in Working Examples 8 to 12, and the $O_2/C$ ratio was set to 0.2.

As shown in FIG. 12 and FIG. 13, in these working examples, the amount of catalyst is greater and the $O_2/C$ ratio is larger than in Working Examples 8 to 12, resulting in an overall higher catalyst layer maximum temperature, however, the reactions were run at temperatures below the thermal decomposition index temperature of the pseudo-natural gas (approximately 777° C.) at all DMS concentrations. Also, there is a trend toward higher catalyst layer maximum temperatures the higher the DMS concentration, and in particular, it was found that the catalyst layer maximum temperature jumps sharply when the DMS concentration is greater than 2.4 mol·ppb. Consequently, it was found that to carry out the reactions at lower catalyst layer maximum temperatures, it is preferable that the DMS concentration is low, particularly preferably at or less than 2.4 mol·ppb and even more preferably at or less than 1.5 mol·ppb.

It should be noted that in these working examples, the maximum temperature Tmax of the catalyst layer ranged from 700° C. to 762° C., which is 15 to 80° C. (15, 50, 80° C.) below the thermal decomposition index temperature of the pseudo-natural gas (approximately 777° C.).

The above Working Examples 1 to 17 and the Comparative Example 6 were performed at standard pressure using an experiment apparatus shown in FIG. 3 of FIG. 9. Consequently, when the heat-resistance properties of the reactors 4 and 9 or the reaction pressure is changed, there is the possibility that the maximum temperature Tmax of the catalyst layer or the output gas composition will change, even if the other conditions are identical to those of the Working Examples 1 to 17 or the Comparative Example 6. However, in this case it is possible to still keep the maximum temperature Tmax of the catalyst layer below the thermal decomposition temperature of the hydrocarbon raw material by changing at least one of the S/C ratio, the $O_2/C$ ratio, and the $CO_2/C$ ratio in the inlet gas or by heating or cooling from the outside.

As described above, the fuel reforming apparatus according to the invention can be used under large gas-space velocity conditions and can be made compact, and thus is suited for use in a mobile member such as an automobile (for installation in a mobile member) or for stationary use (for a stationary compact power source, for example). As for an application in which it is mounted in a mobile member, it can be used to supply hydrogen fuel to a fuel cell that functions as an automobile power system, and one example where it can be used in a stationary compact power source is to supply hydrogen fuel to a fuel cell that is used to generate power in a small office, for example.

Other Embodiments

Other embodiments of a method for operating the reformed gas production apparatus according to the present invention are described below.

In the foregoing embodiment, the reformed gas production apparatus (fuel reforming apparatus) has a two-stage structure constituted by a early stage low-temperature reforming portion 1 (reaction chamber) and a later stage high-temperature reforming portion 2 (second reaction chamber), but it is also possible to adopt a configuration in which it is provided with only the early stage low-temperature reforming portion 1 (reaction chamber).

In the foregoing embodiment, the temperature of the experimental reaction chamber 4A of the reactor 4, which corresponds to the reaction chamber of the low-temperature reforming portion 1, is measured (see FIG. 3), and the $O_2/C$ ratio is changed manually while watching the results of that measurement (that is, the amount of oxygen-containing gas (air) that is supplied is adjusted) in order to adjust the temperature of the reaction chamber 4A, but as shown below, it is also possible to perform this adjusting operation automatically.

Figure 14:
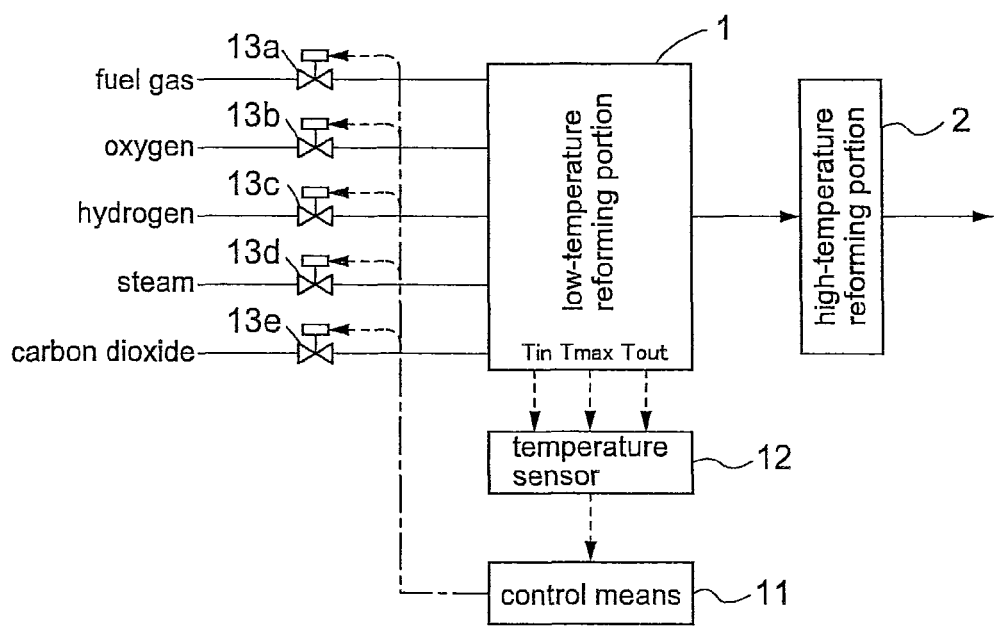
FIG. 14 is a block diagram showing the temperature control structure of the low-temperature reformer according to a separate embodiment of the present invention.

In this separate embodiment, as shown in FIG. 14, a multipoint temperature sensor 12 that detects the temperature, such as Tin (inlet temperature), Tmax (maximum temperature), and Tout (outlet temperature), within the reaction chamber of the low-temperature reforming portion 1, and control means 11 that performs control to adjust the ratio of the amount of at least one of the oxygen-containing gas, steam, and carbon dioxide-containing gas that is supplied with respect to the hydrocarbon fuel based on the information detected by the temperature 12 are provided. Reference numerals 13a to 13e in the drawing denote electromagnetic valves for adjusting the flow rate of the respective gas.

Then, for example based on the maximum temperature Tmax of the reforming reaction region within the reaction chamber, the control means 11 adjusts at least one of the amount of oxygen-containing gas, the amount of the steam-containing gas, and the amount of the carbon dioxide-containing gas with respect to the amount of hydrocarbon fuel that is supplied, performing control such that the thermal decomposition index temperature of the fuel, which is established based on the type and concentration of the hydrocarbons within the fuel, becomes the upper limit of the temperature in the reforming reaction region within the reaction chamber. In particular, if Tmax of the reaction chamber exceeds the thermal decomposition index temperature of the fuel, then either the ratio of the supply amount of at least one of the steam-containing gas and the carbon dioxide-containing gas is increased or the ratio of the supply amount of the oxygen-containing gas is reduced, to cool the reaction chamber.

Further, in the reformed gas production apparatus of the invention, as with the early stage low-temperature reforming portion 1 (reaction chamber) it is also possible to change the ratio of the amount of at least one of the oxygen-containing gas, the steam, and the carbon dioxide-containing gas that is supplied to the later stage high-temperature reforming portion 2 (second reaction chamber) with respect to the reformed gas in order to adjust the temperature of the second reaction chamber.

It should be noted that, although not shown, the later stage reforming portion (high-temperature reforming portion 2), like the early stage reforming portion (low-temperature reforming portion 1), can also be provided with a configuration in which, based on the information detected by a temperature sensor that detects the temperature Tmax within the second reaction chamber, a control means performs control to change the ratio of the amount of at least one of the oxygen-containing gas, the steam, and the carbon dioxide-containing gas that is supplied to the high-temperature reforming portion 2 with respect to the first reformed gas in order to adjust the temperature of the second reaction chamber.

Figure 16:
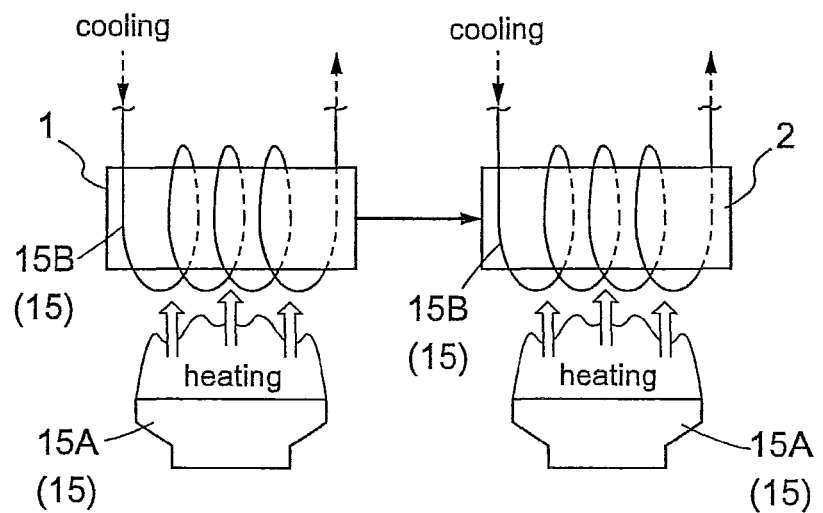
FIG. 16 is a diagram showing the temperature adjustment mechanism of a reformed gas production apparatus according to a separate embodiment of the present invention.
Figure 17:
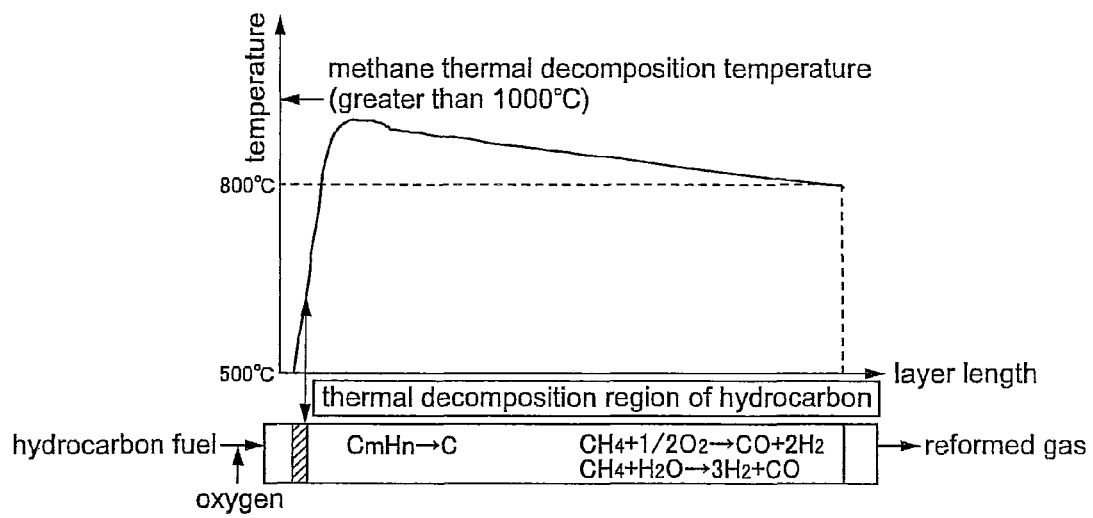
FIG. 17 is a graph showing the structure and the temperature distribution of a conventional partial oxidation reformer.
Figure 18:
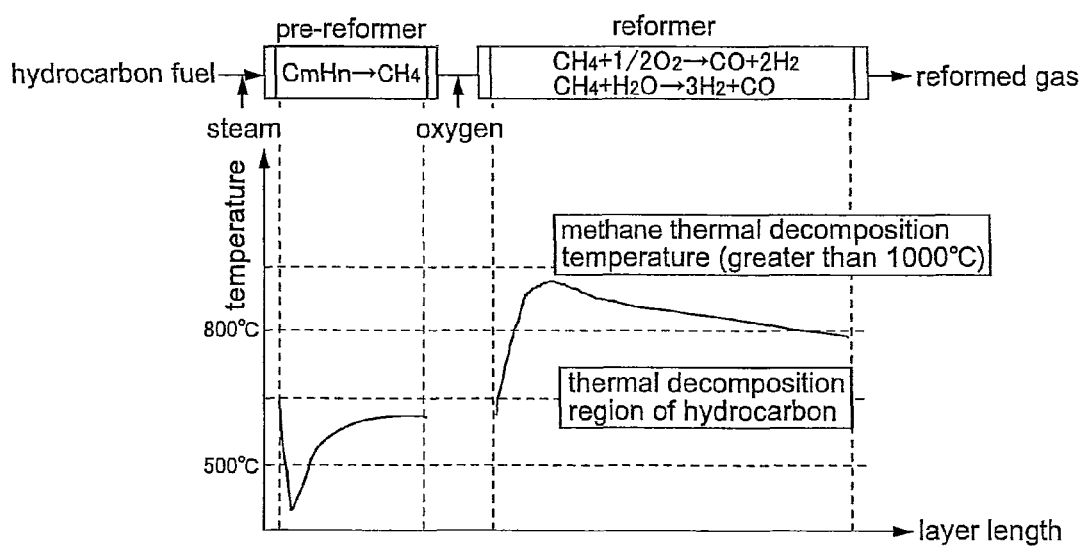
FIG. 18 is a graph of the structure and the temperature distribution of a conventional partial oxidation reforming apparatus with pre-reformer.

Further, an actual reforming apparatus could also be provided with a temperature adjustment mechanism 15 that is capable of forcibly cooling or heating the early stage low-temperature reformer 1 (reaction chamber) from the outside, and a second temperature adjustment mechanism 15 that is capable of forcibly cooling or heating the later stage high-temperature reformer 2 (second reaction chamber) from the outside. Specifically, as illustratively shown in FIG. 16, the temperature adjustment mechanism 15 for the low-temperature reformer 1 (reaction chamber) and the second temperature adjustment mechanism 15 for the high-temperature reformer 2 (second reaction chamber) both are made of a gas burner 15A for heating and a cooling tube 15B through which a cooling fluid is passed to cause a cooling effect.

The temperature adjustment mechanisms 15 can also be configured such that they automatically perform a control to cool the reaction chamber if based on the temperature sensor 11 shown in FIG. 14 it is determined that the maximum temperature of the reforming reaction region has exceeded the thermal decomposition index temperature of the fuel.

Figure 15:
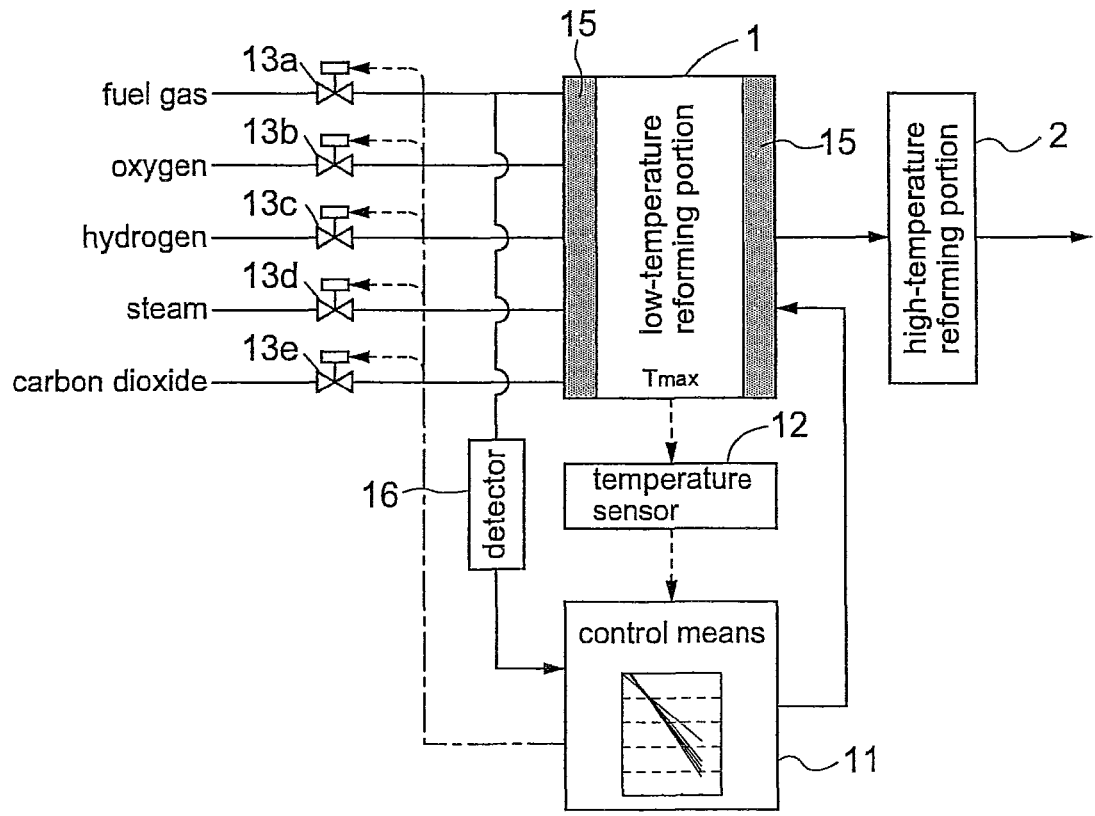
FIG. 15 is a block diagram showing the temperature control structure of the low-temperature reformer according to yet another separate embodiment of the present invention.

Further, as shown in FIG. 15, the reformed gas production apparatus of the present invention can also be provided with a detector 16 that detects the type and the concentration of the hydrocarbons in the fuel that is supplied to the early stage low-temperature reforming portion 1 (reaction chamber), and control means 11 that performs control to derive the thermal decomposition index temperature of that fuel from the relationship between the type and the concentration of the hydrocarbons, such as that shown in FIG. 19, based on the information detected by the detector 16.

If it is determined that the Tmax (maximum temperature) in the reforming reaction region of the low-temperature reforming portion 1 that is detected by the temperature sensor 12 has exceeded the thermal decomposition index temperature, which is set based on the detector 16, then the control means 11 controls the electromagnetic valves 13a to 13e for adjusting the flow of the respective gases to either increase the supply amount ratio of at least one of the steam-containing gas and the carbon dioxide-containing gas or reduce the supply amount ratio of the oxygen-containing gas, or alternatively controls the temperature adjustment mechanism 15 in order to cool the low-temperature reforming portion 1 (reaction chamber). By running the reactions with the thermal decomposition index temperature serving as the upper limit temperature in this way, it is possible to realize a reforming operation that has excellent reactivity yet that is without problem.

It should be noted that there are no particular limitations regarding the detector 16 for detecting the type and the concentration of the hydrocarbons, and for this it is possible to use a conventional, publicly available sensor, for example. Also, if the composition of the fuel to be used is known beforehand, then it is also possible to specify the type of the hydrocarbons detected and for the detector 16 to detect only the concentration of those.

With this reformed gas production apparatus it is possible to derive the ideal thermal decomposition index temperature even if the type or composition of the fuel that is supplied changes, and thus it is possible to prevent thermal decomposition of the fuel.

In the foregoing embodiments, the reforming catalyst and the second reforming catalyst used a metal that has the ability to reform steam, and normally has the ability to reform steam as well as a the ability to cause partial oxidation.

INDUSTRIAL APPLICABILITY

The reformed gas production method and the reformed gas production apparatus according to the present invention can be employed in the field of synthesis gas production, such as in the production of liquid fuel from natural gas (GTL), and in the field of hydrogen production for fuel cells, for example.

The invention claimed is:

1. A reformed gas production apparatus comprising:
a reaction chamber containing a reforming catalyst;
a supply route connected to a fuel source that contains a plurality of types of hydrocarbons and configured to supply a fluid that includes a fuel containing a hydrocarbon having at least two carbon atoms, at least one of steam and a carbon dioxide-containing gas, and an oxygen-containing gas, to the reaction chamber;
a reformed gas conduction route configured to conduct a reformed gas that is produced through a reforming reaction and that includes methane, hydrogen, and carbon monoxide, from the reaction chamber; and
reaction chamber temperature control means programmed to control a temperature of the reaction chamber;
wherein the fuel is a mixed fuel that contains a plurality of types of hydrocarbons each having at least two carbon atoms; and
wherein the reaction chamber temperature control means is programmed to regard the thermal decomposition index temperature of the fuel, which is a value of the lowest thermal decomposition temperature of the plurality of types of hydrocarbons that make up the fuel, the thermal decomposition temperature being determined based on a gas type and a concentration of hydrocarbons having at least two carbon atoms that make up the fuel, as an upper limit temperature of the reforming reaction region, and in a case where the maximum temperature in the reforming reaction region exceeds the upper limit temperature, the reaction chamber temperature control means performs control to cool the reaction chamber.

2. The reformed gas production apparatus according to claim 1, wherein a value of the lowest temperature of the thermal decomposition temperatures that are found based on a concentration in the fuel of at least two types of hydrocarbons of the hydrocarbons having at least two carbon atoms that make up the fuel is selected as the thermal decomposition index temperature of the fuel.

3. The reformed gas production apparatus according to claim 1, wherein the fuel contains at least 50% methane.

4. The reformed gas production apparatus according to claim 1, wherein the fuel is a natural gas, and the thermal decomposition index temperature of the fuel is set to the value of the lowest temperature of the thermal decomposition temperatures that are found based on a concentration in the fuel of hydrocarbons having from 2 to 5 carbon atoms that make up the fuel.

5. The reformed gas production apparatus according to claim 1, wherein the concentration is the hydrocarbon concentration of the fuel at an inlet portion of the reaction chamber.

6. The reformed gas production apparatus according to claim 1, wherein a temperature sensor that detects the temperature of the reforming reaction region, and control means that controls the temperature of the reaction chamber by adjusting a supply amount ratio of at least one of the oxygen-containing gas, the steam, and the carbon dioxide-containing gas with respect to the fuel based on the information detected by the temperature sensor, are provided as the reaction chamber temperature control means.

7. The reformed gas production apparatus according to claim 1, further comprising:
a temperature adjustment mechanism that is capable of cooling or heating the reforming reaction region.

8. The reformed gas production apparatus according to claim 1, further comprising:
   detection means that detects a type and a concentration of hydrocarbons having at least two carbon atoms that make up the fuel that is supplied to the reaction chamber; and
   thermal decomposition index temperature derivation means that derives the thermal decomposition index temperature of the fuel based on the type and the concentration of the hydrocarbons detected by the detection means.

9. The reformed gas production apparatus according to claim 1, further comprising:
   a desulfurizing apparatus before the reaction chamber that desulfurizes at least one of the fuel, the oxygen-containing gas, the steam, and the carbon dioxide-containing gas.

10. The reformed gas production apparatus according to claim 1, further comprising:
    a second reaction chamber that contains a second reforming catalyst and that produces a second reformed gas that includes hydrogen and carbon monoxide through a second reforming reaction of the reformed gas that has been conducted from the reaction chamber;
    wherein a maximum temperature in the second reforming reaction region of the second reaction chamber is maintained within a temperature range of 400 to 1200° C., and an outlet temperature of the second reaction chamber is adjusted such that it is higher than an outlet temperature of the reaction chamber.

11. The reformed gas production apparatus according to claim 1, wherein the reformed gas production apparatus is used in mobile and stationary applications alike.

* * * * *